(12) United States Patent
Tanimoto et al.

(10) Patent No.: US 8,825,297 B2  
(45) Date of Patent: Sep. 2, 2014

(54) DEVICE FOR CONTROLLING VEHICLE TRAVEL

(75) Inventors: Mitsutaka Tanimoto, Susono (JP); Theerawat Limpibunterng, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/505,209

(22) PCT Filed: Oct. 30, 2009

(86) PCT No.: PCT/JP2009/069013  
§ 371 (c)(1),  
(2), (4) Date: Apr. 30, 2012

(87) PCT Pub. No.: WO2011/052098  
PCT Pub. Date: May 5, 2011

(65) Prior Publication Data  
US 2012/0215406 A1   Aug. 23, 2012

(51) Int. Cl.  
*B62D 6/00* (2006.01)  
*B62D 7/00* (2006.01)  
*B62D 5/06* (2006.01)  
*B62D 5/04* (2006.01)

(52) U.S. Cl.  
USPC .............. 701/41; 180/412; 180/440; 180/443

(58) Field of Classification Search  
CPC ............ B62D 6/00; B62D 37/00; B62D 1/65; B60R 1/00; B60R 1/002; B60R 1/62  
USPC ............ 180/444, 446, 412, 197, 443; 701/41, 701/42  
See application file for complete search history.

(56) References Cited

U.S. PATENT DOCUMENTS 6,671,598 B2 * 12/2003 Laurent .......................... 701/41  
7,835,836 B2 * 11/2010 Bolourchi et al. .............. 701/41  
(Continued)

FOREIGN PATENT DOCUMENTS

JP     2002-12159 A    1/2002  
JP     2003 137122     5/2003  
(Continued)

OTHER PUBLICATIONS

International Search Report issued on Mar. 2, 2010 in PCT/JP09/069013 filed on Oct. 30, 2009.

(Continued)

*Primary Examiner* — Fadey Jabr  
*Assistant Examiner* — Luis A Martinez Borrero  
(74) *Attorney, Agent, or Firm* — Oblon, Spivak, McClelland, Maier & Neustadt, L.L.P.

(57) ABSTRACT

A travel control device for a vehicle provided with: a steering angle control device that alters the relationship between the amount of steering operation of a driver and the steering angle of steerable wheels; a trajectory control device that controls the travel trajectory of the vehicle by means of controlling the steering angle of the steerable wheels; and a turning condition control device that determines a target turning condition control level for causing the turning condition of the vehicle to be a target turning condition, and controls the turning condition of the vehicle on the basis of the target turning condition control level. A turning condition control device calculates the target turning condition control level on the basis of the amount of steering operation of the driver and the control level of the trajectory control device, and thereby reflects in the target turning condition control level changes to the steering angle resulting from the control of the traveling trajectory.

10 Claims, 11 Drawing Sheets

(56) References Cited

U.S. PATENT DOCUMENTS

| | | | |
|---|---|---|---|
| 7,835,837 B2 | 11/2010 | Suzumura et al. | |
| 7,997,373 B2 * | 8/2011 | Yasui et al. | 180/197 |
| 8,046,132 B2 * | 10/2011 | Auguet et al. | 701/41 |
| 2003/0055547 A1 | 3/2003 | Chen et al. | |
| 2004/0193345 A1 * | 9/2004 | Chen et al. | 701/42 |
| 2005/0072621 A1 * | 4/2005 | Hara et al. | 180/444 |
| 2006/0047391 A1 * | 3/2006 | Katou | 701/41 |
| 2006/0069481 A1 * | 3/2006 | Kubota et al. | 701/41 |
| 2006/0080016 A1 * | 4/2006 | Kasahara et al. | 701/41 |
| 2006/0086561 A1 * | 4/2006 | Hidaka | 180/446 |
| 2006/0200289 A1 * | 9/2006 | Chino et al. | 701/41 |
| 2007/0176488 A1 * | 8/2007 | Miyajima et al. | 303/146 |
| 2007/0233344 A1 * | 10/2007 | Satake | 701/41 |
| 2007/0299583 A1 * | 12/2007 | Fujita et al. | 701/41 |
| 2008/0051959 A1 * | 2/2008 | Ishihara et al. | 701/41 |
| 2008/0091321 A1 * | 4/2008 | Nishikawa | 701/44 |
| 2008/0142293 A1 * | 6/2008 | Goto et al. | 180/446 |
| 2008/0306655 A1 * | 12/2008 | Ukai et al. | 701/42 |
| 2009/0093931 A1 * | 4/2009 | Mizutani et al. | 701/42 |
| 2009/0095562 A1 * | 4/2009 | Yasui et al. | 180/412 |
| 2009/0173566 A1 * | 7/2009 | Ogasawara | 180/446 |
| 2009/0234538 A1 * | 9/2009 | Ta et al. | 701/41 |
| 2009/0312909 A1 * | 12/2009 | Onuma | 701/41 |
| 2010/0082203 A1 * | 4/2010 | Isaji et al. | 701/41 |
| 2010/0094505 A1 * | 4/2010 | Kariatsumari et al. | 701/41 |
| 2010/0114431 A1 * | 5/2010 | Switkes et al. | 701/41 |
| 2010/0121530 A1 * | 5/2010 | Suzuki et al. | 701/41 |
| 2010/0222968 A1 * | 9/2010 | Kifuku et al. | 701/42 |
| 2011/0022268 A1 * | 1/2011 | Kojo | 701/41 |
| 2011/0130923 A1 * | 6/2011 | Watanabe | 701/41 |

FOREIGN PATENT DOCUMENTS

| | | |
|---|---|---|
| JP | 2003 191774 | 7/2003 |
| JP | 2005 255107 | 9/2005 |
| JP | 2006 117070 | 5/2006 |
| JP | 2006 143096 | 6/2006 |
| JP | 2007 269180 | 10/2007 |
| JP | 2007 331581 | 12/2007 |
| JP | 2009-51355 A | 3/2009 |
| WO | WO 2009/125271 A1 | 10/2009 |

OTHER PUBLICATIONS

Office Action issued Nov. 20, 2013 in European Patent Application No. 09 850 876.5.

* cited by examiner

2

DEVICE FOR CONTROLLING VEHICLE TRAVEL

TECHNICAL FIELD

The present invention relates to a device for controlling vehicle travel and, more particularly, to a travel control device for a vehicle which is provided with a steering angle control device that alters the relationship between the amount of steering operation of a driver and the steering angle of steerable wheels.

BACKGROUND ART

In a field of vehicle such as an automobile and the like, a steering angle control device such as a steering transmission ratio varying unit and a steerable wheel steering device of steer-by-wire type is well known which alters the relationship between the amount of steering operation of a driver and the steering angle of steerable wheels. Various travel control devices for vehicles have been proposed which execute vehicle stability control for enhancing stability of vehicle turn behavior in vehicles provided with such steering angle control devices.

For example, in Japanese Patent Laid-Open Publication No. 2006-117070 is described a travel control device for a vehicle which controls the steering angle of steerable wheels by means of a steering angle control device so that the vehicle travels along a target travel line and, when the steering angle of steerable wheels is controlled by means of a steering angle control device, lowers the start condition level of a vehicle stability control as compared with the case where the steering angle of steerable wheels is not controlled.

According to the above-described conventional travel control device, the start condition level of the vehicle stability control is lowered when the turning behavior stability of the vehicle decreases under the situation where a vehicle travel control is executed which controls the steering angle of steerable wheels by means of a steering angle control device. Accordingly, when a vehicle travel control is executed, vehicle stability control can be rendered to be started earlier, which enables to stabilize the turn behavior stability of the vehicle earlier.

In such a conventional travel control device as described in the above publication, however, when a travel trajectory control is executed, the steering angle control device alters the relationship between the amount of steering operation of a driver and the steering angle of steerable wheels, and, accordingly, the amount of steering operation of a driver does not correspond to the actual steering angle of the steerable wheels any more.

In spite of the above, in such a conventional travel control device as described in the above publication, a target turning state quantity of a vehicle is calculated on the basis of the amount of steering operation of a driver and turning state quantity of the vehicle is controlled to be the target turn state quantity of the vehicle. Accordingly, a target control level of the vehicle stability control can not be calculated to be a suitable value which reflects the change of the steering angle of steerable wheels caused by the travel trajectory control and, due to this, the vehicle stability control can not be properly executed.

To cope with the above problem, it may be considered to calculate a target turn state quantity of a vehicle on the basis of actual steering angle of steerable wheels. However, in the case where the vehicle stability control is executed by means of the control of braking-driving force of each wheel and the control of steering angle of steerable wheels, actual steering angle of steerable wheels becomes a value which reflects the both control results of the travel trajectory control and the vehicle stability control. Accordingly, the turn state quantity of the vehicle which is calculated on the basis of actual steering angle of steerable wheels includes error components corresponding to the control level of steering angle of steerable wheels by the vehicle stability control and, due to this, the vehicle stability control can not be properly executed as well.

Furthermore, the above-mentioned two problems are not inherent in the case where the control of steering angle of steerable wheels is conducted by a travel trajectory control, but arise in the cases where a steering characteristic control for altering a steering transmission ratio is executed or both a travel trajectory control and a steering characteristic control are executed.

DISCLOSURE OF THE INVENTION

A primary object of the present invention is to calculate a target control level of a vehicle stability control for enhancing stability of vehicle turning behavior to be a proper value to appropriately execute the vehicle stability control even when a steering angle control device alters the relationship between the amount of steering operation of a driver and the steering angle of steerable wheels.

The present invention provides a travel control device for a vehicle provided with: a steering angle control device that alters the relationship between the amount of steering operation of a driver and the steering angle of steerable wheels; a trajectory control device that controls the travel trajectory of the vehicle by controlling the steering angle of the steerable wheels by means of said steering angle control device; and a turning condition control device that determines a target turning condition control level for causing the turning condition of the vehicle to be a target turning condition, and controls the turning condition of the vehicle on the basis of the target turning condition control level, wherein the turning condition control device calculates the target turning condition control level on the basis of the amount of steering operation of the driver and the control level of the trajectory control device.

According to the above-described configuration, the target turning condition control level is calculated on the basis of the amount of steering operation of the driver and the control level of the trajectory control device. Accordingly, even when the steering angle of the steerable wheels is changed by the control of trajectory control, the target turning condition control level can be calculated on the basis of an appropriate value which reflects the change in the steering angle of the steerable wheels caused by the control of travel trajectory, which enables to appropriately execute the turning condition control of the vehicle.

The above-mentioned configuration may be such that the steering angle control device has a steering characteristic control function to alter the relationship between the amount of steering operation of the driver and the steering angle of the steerable wheels so as to achieve a predetermined steering characteristic and the turning condition control device calculates the target turning condition control level taking account of the variation in the steering angle of the steerable wheels caused by the steering characteristic control function.

According to this configuration, the target turning condition control level is calculated taking account of the variation in the steering angle of the steerable wheels caused by the steering characteristic control function. Accordingly, even when the steering angle of the steerable wheels is changed by the steering characteristic control function, the target turning condition control level can be calculated on the basis of a proper value which reflects the change in the steering angle of the steerable wheels caused by the steering characteristic control function, which enables to appropriately execute the turning condition control of the vehicle.

The above-mentioned configuration may be such that the turning condition control device controls the turning condition of the vehicle by controlling at least the steering angle of the steerable wheels by means of the steering angle control device but calculates the target turning condition control level on the basis of the amount of steering operation of the driver and a control level of the trajectory control device without taking account of the control level for controlling the turning condition of the vehicle.

According to this configuration, the target turning condition control level is calculated on the basis of the amount of steering operation of the driver and a control level of the trajectory control device without taking account of the control level for controlling the turning condition of the vehicle. Accordingly, the target turning condition control level can be prevented from being calculated to be an inappropriate value on the basis of an inappropriate steering angle reflecting the change in the steering angle of the steerable wheels caused by the control of the turning condition.

The above-mentioned configuration may be such that the turning condition control device calculates a target turning state quantity on the basis of the amount of steering operation of the driver and a control level of the trajectory control device, and calculates a target turning condition control level on the basis of the target turning state quantity, which is one of a target yaw rate of the vehicle, a target steering angle of the steerable wheels, a target control level of the steering angle control device and a target amount of steering operation of the driver.

According to this configuration, a target turning condition control level can be calculated on the basis of one of a target yaw rate of the vehicle, a target steering angle of the steerable wheels, a target control level of the steering angle control device and a target amount of steering operation of the driver.

The present invention also provides a travel control device for a vehicle provided with: a steering angle control device that alters the relationship between the amount of steering operation of a driver and the steering angle of steerable wheels; a relationship control device that controls the relationship by means of the steering angle control device, and a turning condition control device that determines a target turning condition control level for causing the turning condition of the vehicle to be a target turning condition, and controls the turning condition of the vehicle by controlling the steering angle of the steerable wheels by means of the steering angle control device on the basis of the target turning condition control level, wherein the turning condition control device calculates the target turning condition control level on the basis of the steering angle of the steerable wheels and the control level of the turning condition control device.

According to this configuration, the target turning condition control level is calculated on the basis of the steering angle of the steerable wheels and the control level of the turning condition control device. Accordingly, the target turning condition control level can be calculated on the basis of an appropriate value which is the steering angle of the steerable wheels removed of the steering angle component corresponding to the control level of the turning condition control device. Therefore, the control of vehicle turning condition can be appropriately executed without being affected by the change in the steering angle of the steerable wheels caused by the control of the vehicle turning condition.

The above-mentioned configuration may be such that the relationship control device is at least one of a trajectory control device that controls the travel trajectory of the vehicle by controlling the steering angle of the steerable wheels and a steering characteristic control device that alters the relationship between the amount of steering operation of the driver and the steering angle of the steerable wheels so as to achieve a predetermined steering characteristic.

According to this configuration, even when at least on of the trajectory control device and the steering characteristic control device alters the relationship between the amount of steering operation of the driver and the steering angle of the steerable wheels, the target turning condition control level can be calculated on the basis of an appropriate value which reflects the change in the steering angle of the steerable wheels caused by the control. Therefore, the control of vehicle turning condition can be appropriately executed reflecting the change in the steering angle of the steerable wheels caused by at least one of the trajectory control device and the steering characteristic control device.

The above-mentioned configuration may be such that the turning condition control device calculates a target turning state quantity on the basis of the steering angle of the steerable wheels and a control level of the turning condition control device, and calculates a target turning condition control level on the basis of the target turning state quantity, which is one of a target yaw rate of the vehicle, a target steering angle of the steerable wheels, a target control level of the steering angle control device and a target amount of steering operation of the driver.

According to this configuration, a target turning condition control level can be calculated on the basis of one of a target yaw rate of the vehicle, a target steering angle of the steerable wheels, a target control level of the steering angle control device and a target amount of steering operation of the driver.

The above-mentioned configuration may be such that the turning condition control device controls the turning condition of the vehicle by controlling at least a braking-driving force of each vehicle wheel.

According to this configuration, since the turning condition of the vehicle is controlled by controlling at least a braking-driving force of each vehicle wheel, the turning condition of the vehicle can be controlled without having to control the steering angle of the steerable wheels.

The above-mentioned configuration may be such that the steering angle control device is a steering angle control device of a steer-by-wire type having a steering input unit, a steering mechanism which changes the steering angle of the steerable wheels, a means for detecting an amount of steering operation of a driver given to the steering input unit and control means for controlling the steering mechanism based on the amount of steering operation of the driver.

The above-mentioned configuration may be such that the steering angle control device is of a semi-steer-by-wire type having a steering transmission ratio varying device which steers the steerable wheels relative to an steering input unit to change the steering angle of the steerable wheels, and a control means for controlling the steering transmission ratio varying device.

The above-mentioned configuration may be such that the steering angle of the steerable wheels is derived based on the actuating amount of a means for actuating the steerable wheels.

The above-mentioned configuration may be such that the steering angle of the steerable wheels is derived based on the control level of the steering angle control device.

BEST MODE FOR CARRYING OUT THE INVENTION

The present invention will now be described in detail with respect to preferred embodiments by referring to the accompanying drawings.

First Embodiment

Figure 1:
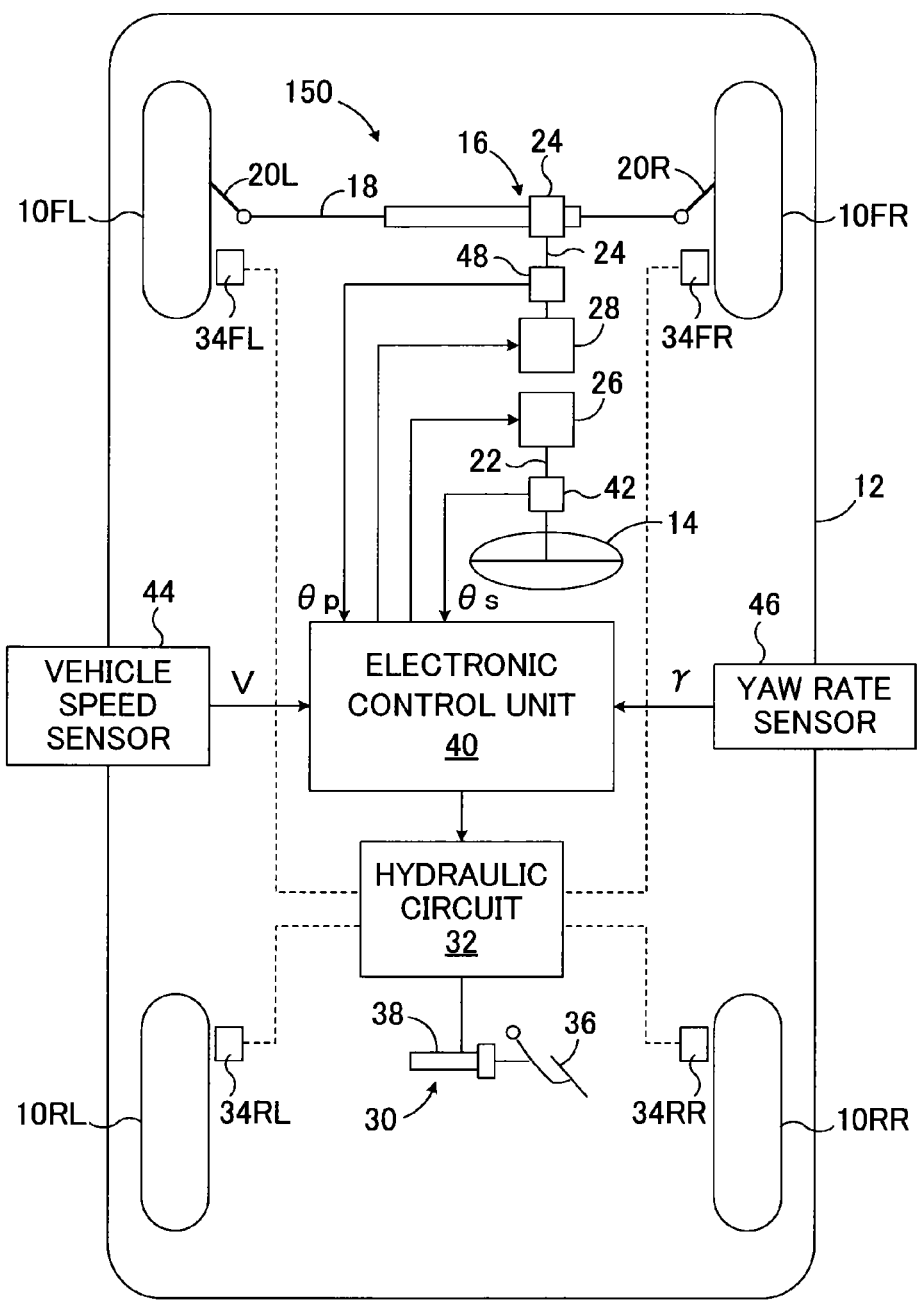
FIG. 1 is a schematic diagram showing a first embodiment of the travel control device according to the present invention which is applied to a vehicle of a steer-by-wire type and is adapted to execute a vehicle behavior control by controlling a braking-driving force of each vehicle wheel.

FIG. 1 is a schematic diagram showing a first embodiment of the travel control device according to the present invention which is applied to a vehicle of a steer-by-wire type and is adapted to execute a vehicle behavior control by controlling a braking-driving force of each vehicle wheel.

In FIG. 1, 150 denotes an entire travel control device of the first embodiment. 10FL, 10FR denote left and right front wheels, respectively, which serve as steerable wheels of a vehicle 12, and 10RL, 10RR denote left and right rear wheels, respectively. When a steering wheel 14 serving as a steering input unit is operated by a driver, a rack bar 18 and tie rods 20L, 20R are actuated by means of a power steering mechanism 16 of a rack and pinion type, which steers left and right front wheels 10FL, 10FR.

A steering shaft 22 coupled to the steering wheel 14 and a pinion shaft 24 of the steering mechanism 16 is not mechanically connected with each other. A steering reaction force applying electric motor 26 is connected to the steering shaft 22 via a speed reduction gear mechanism, not shown in FIG. 1. The electric motor 26 is controlled by a steering angle control section of an electronic control unit 40 to impart predetermined steering reaction torque to the steering wheel 14. A steering electric motor 28 is connected to the pinion shaft 24 via a speed reduction gear mechanism, not shown in FIG. 1. The electric motor 28 is controlled by the steering angle control section of the electronic control unit 40 to rotate the pinion shaft 24.

It is to be noted that while in the illustrated embodiment, the rotation of the pinion shaft 24 is converted to a linear motion of the rack bar 18 by means of the steering mechanism 16 of a rack and pinion type which functions as a rotation-linear motion conversion mechanism, the steering mechanism may be of any configuration known in the art.

Braking forces of the vehicle wheels are controlled through control of respective braking pressures in associated wheel cylinders 34FL, 34FR, 34RL, 34RR by a hydraulic circuit 32 of a braking apparatus 30. The hydraulic circuit 32 includes a reservoir, an oil pump, and various valve units, etc., although they are not illustrated. Pressure in each wheel cylinder is usually controlled by a master cylinder 38 driven by driver's operation of depressing a brake pedal 36, and is individually controlled as necessary by a braking force control section or a vehicle behavior control section of the electronic control unit 40 as described in detail hereinafter.

The steering shaft 22 is provided with a steering angle sensor 42 which detects a steering angle θ and a signal indicative of a steering angle θ is input to the electronic control unit 40. The electronic control unit 40 also receives a signal indicative of a vehicle speed V detected by a vehicle speed sensor 44, a signal indicative of a vehicle yaw rate γ detected by a yaw rate sensor 46, and a signal indicative of a rotation angle θp of the pinion shaft 24 detected by a rotation angle sensor 48. The steering angle sensor 42, the yaw rate sensor 46 and the rotation angle sensor 48 detect a steering angle θ, a yaw rate γ and a rotation angle θp, respectively with the detected variables being deemed to be positive when steering is conducted in left turning direction of the vehicle.

The steering angle control section of the electronic control unit 40 usually calculates a steering gear ratio Rs, which is an inverse number of steering transmission ratio, for achieving a predetermined steering characteristic on the basis of a vehicle speed V so that as the vehicle speed V increases, steering gear ratio Rs becomes large. The steering angle control section of the electronic control unit 40 also calculates a target rotation angle θpt1 of the pinion shaft 24 on the basis of a steering angle θ and a steering gear ratio Rs, and controls the electric motor 28 so that the rotation angle θp of the pinion shaft 24 conforms to the target rotation angle θpt1. Accordingly, the left and right front wheels 10FL, 10FR are steered in accordance with the steering operation of the driver to achieve the predetermined steering characteristic.

Although not illustrated in FIG. 1, the travel control device 150 has a travel trajectory control switch which controls on and off of travel trajectory control for controlling a travel trajectory of the vehicle, such as a lane keeping assist control, an intelligent parking assist control, and an automated cruise control. When the travel trajectory control switch is on and the travel trajectory control is executed, a trajectory control section of the electronic control unit 40 calculates a target travel trajectory of the vehicle and a target vehicle speed. The trajectory control section of the electronic control unit 40 steers the left and right front wheels 10FL, 10FR and controls the vehicle speed V irrespective of the steering operation by the driver so that the travel trajectory of the vehicle conforms to the target travel trajectory and the vehicle speed V conforms to the target vehicle speed. It is to be understood that a kind of travel trajectory control may be executed in stead of multiple kinds of travel trajectory controls.

The vehicle behavior control section of the electronic control unit 40 calculates a target yaw rate γt of the vehicle and calculates a difference Δγ between the target yaw rate γt and an actual yaw rate γ of the vehicle which is detected by the yaw rate sensor 46. When the magnitude of the difference Δγ is equal to or larger than a reference value γo, the vehicle behavior control section of the electronic control unit 40 calculates a target yaw moment Mt and a target longitudinal force Ft of the vehicle for stabilizing the turning behavior of the vehicle on the basis of the yaw rate difference Δγ.

In addition, the vehicle behavior control section of the electronic control unit 40 calculates target braking-driving forces Fwti (i=fl, fr, rl, rr) of the vehicle wheels on the basis of the target yaw moment Mt and the target longitudinal force Ft, and controls the braking-driving forces of the vehicle wheels to be the associated target braking-driving forces Fwti so that the yaw rate difference Δγ is reduced in magnitude to stabilize the turning behavior of the vehicle.

The steering angle control section, the trajectory control section, the braking force control section, and the vehicle behavior control section of the electronic control unit 40 may be those which comprise microcomputers and drive circuits, and each microcomputer may have a CPU, ROM, RAM, and an input/output port connected with one another via a bidirectional common bus. The microcomputers of the control sections of the electronic control unit 40 are connected to each other so as to communicate with each other.

Figure 2:
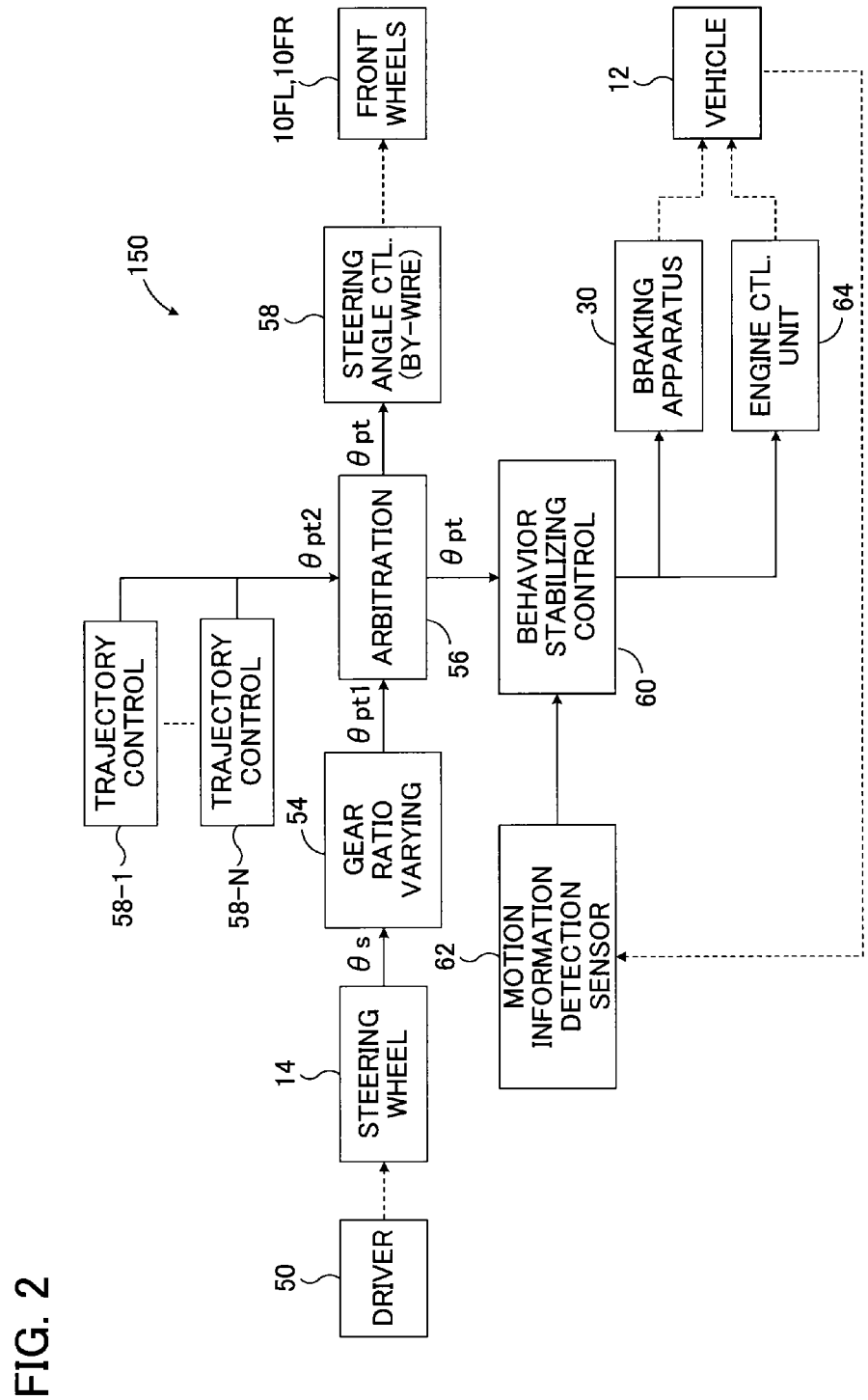
FIG. 2 is a block diagram showing the control executed in the first embodiment.

Referring now to the block diagram shown in FIG. 2, the configuration and the operation of the first embodiment are further explained.

As illustrated in FIG. 2, when the steering wheel 14 is operated by a driver 50, steering angle θs changes accordingly. The steering angle θs is divided by a steering gear ratio Rs by means of a steering gear ratio varying block 54, by which a target rotation angle θpt1 of the pinion shaft 24 for achieving the predetermined steering characteristic is calculated and is input to an arbitration block 56.

When any one of trajectory control blocks 58-1 to 58-N is on which execute a travel trajectory control such as a lane keeping assist control, an intelligent parking assist control, and an automated cruise control, the arbitration block 56 is supplied from the trajectory control block with a target rotation angle θpt2 of the pinion shaft 24 for executing the travel trajectory control.

The arbitration block 56 arbitrates the target rotation angle θpt1 of the pinion shaft 24 for achieving the predetermined steering characteristic and the target rotation angle θpt2 of the pinion shaft 24 for executing the travel trajectory control to calculate an arbitrated target rotation angle θpt of the pinion shaft 24.

It is to be noted that since the arbitration itself conducted in the arbitration block 56 dose not constitute a main part of the present invention, it may be conducted in any manner so long as an arbitrated target rotation angle θpt of the pinion shaft 24 is calculated taking account of both the target rotation angles θpt1 and θpt2. For example, if a rotation angle of the pinion shaft 24 corresponding to the steering angle under the situation where the control for the predetermined steering characteristic is not executed is represented by θpt0; a difference between the target rotation angle θpt1 and the rotation angle θpt0 is represented by Δθpt1; and a difference between the target rotation angle θpt2 and the rotation angle θpt0 is represented by Δθpt2, the arbitrated target rotation angle θpt of the pinion shaft 24 may be calculated to θpt0+K1Δθpt1+K2Δθpt2. The coefficients K1 and K2 may be set to 1 or may be set to a value which is not smaller than 0 and is not larger than 1 in accordance with vehicle behavior, circumference information and the like. In addition, the arbitrated target rotation angle θpt of the pinion shaft 24 may be set as necessary to a larger one of the target rotation angles θpt1 and θpt2.

The information of the arbitrated target rotation angle θpt of the pinion shaft 24 is input to a steering angle control block 58 which controls the steering angle of the left and right front wheels 10FL, 10FR. The steering angle control block 58 controls the electric motor 28 based on the arbitrated target rotation angle θpt of the pinion shaft 24 so that the rotation angle θp of the pinion shaft 24 conforms to the arbitrated target rotation angle θpt. Thus, the steering angle of the left and right front wheels 10FL, 10FR is controlled to a steering angle θwt corresponding to the arbitrated target rotation angle θpt.

The information of the arbitrated target rotation angle θpt of the pinion shaft 24 is also input to a behavior stabilizing control block 60 which controls braking-driving forces of the vehicle wheels to stabilize the vehicle turning behavior. The behavior stabilizing control block 60 is supplied with motion information such as a lateral acceleration Gy from motion information detection sensor 62. The behavior stabilizing control block 60 calculates a target yaw rate γt of the vehicle on the basis of steering angle θwt corresponding to the arbitrated target rotation angle θpt, the lateral acceleration Gy of the vehicle and the like.

For example, the behavior stabilizing control block 60 may calculate a target yaw rate γt of the vehicle on the basis of a steering angle θwt corresponding to the arbitrated target rotation angle θpt, a lateral acceleration Gy of the vehicle and a vehicle speed V according to the following equation 1 in which wheel base of the vehicle is represented by L and stability factor is represented by Kh.

$$\gamma t = \left(\frac{\theta wt}{L} - KhGy\right)V \tag{1}$$

The behavior stabilizing control block 60 achieves the above-described function of the behavior control section of the electronic control unit 40 to calculate a target yaw moment Mt and a target longitudinal force Ft of the vehicle. In addition, the behavior stabilizing control block 60 calculates target braking-driving forces Fwti of the vehicle wheels on the basis of the target yaw moment Mt and the target longitudinal force Ft and controls the braking apparatus 30 and an engine control unit 64 so that the braking-driving forces of the vehicle wheels conform to the associated target braking-driving forces Fwti. Thus, the behavior stabilizing control block 60 controls the braking-driving forces of the vehicle wheels to be the associated target braking-driving forces Fwti so that the yaw rate difference Δγ is reduced in magnitude to stabilize turning behavior of the vehicle 12.

According to the first embodiment, arbitration is made between the target rotation angle θpt1 of the pinion shaft 24 for achieving the predetermined steering characteristic and the target rotation angle θpt2 of the pinion shaft 24 for executing the travel trajectory control to calculate an arbitrated target rotation angle θpt of the pinion shaft 24. A target yaw rate γt of the vehicle is calculated on the basis of steering angle θwt corresponding to the arbitrated target rotation angle θpt, a lateral acceleration Gy of the vehicle and the like, and the braking-driving forces of the vehicle wheels are controlled so that the yaw rate difference Δγ between the target yaw rate γt and an actual yaw rate γ of the vehicle is reduced in magnitude to stabilize the turning behavior of the vehicle 12.

Accordingly, steering angle θwt corresponding to the arbitrated target rotation angle θpt is different from a target rotation angle θpt1 of the pinion shaft 24 for achieving the predetermined steering characteristic and becomes a value which reflects the change in steering angle of the left and right front wheels 10FL, 10FR caused by the travel trajectory control. Steering angle θwt corresponding to the arbitrated target rotation angle θpt becomes a value which more desirably reflects steering operation by the driver than actual steering angle of the left and right front wheels 10FL, 10FR.

Figure 3:
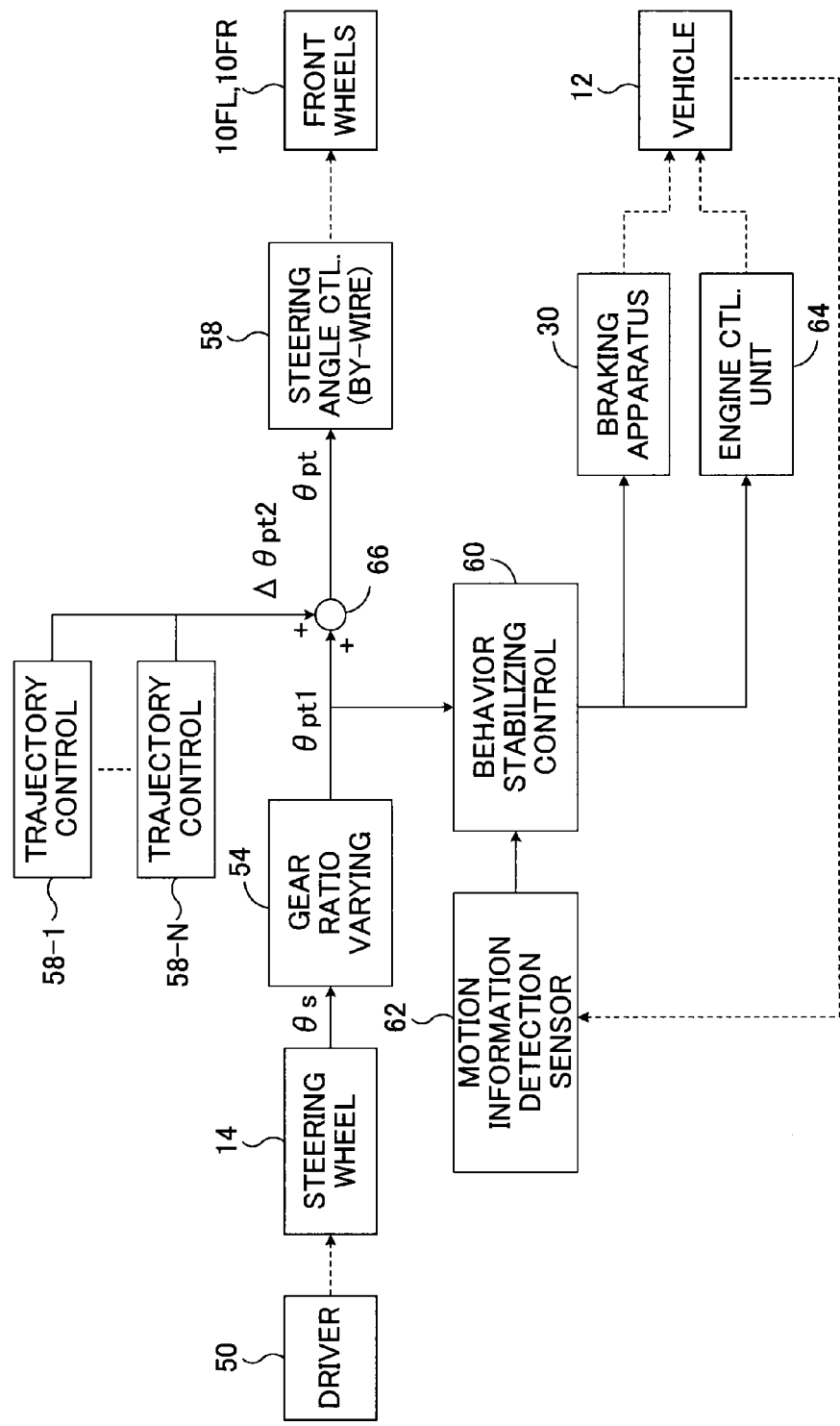
FIG. 3 is a block diagram showing the control executed in a conventional travel control device which is applied to a vehicle of a steer-by-wire type and is adapted to execute a vehicle behavior control by controlling a braking-driving force of each vehicle wheel.

FIG. 3 is a block diagram similar to FIG. 2 showing a conventional travel control device applied to a vehicle of a steer-by wire type. In the conventional travel control device shown in FIG. 3, a target correction amount Δθpt2 of the rotation angle of the pinion shaft 24 for the travel trajectory control is calculated by one of trajectory control blocks 58-1 to 58-N. A target rotation angle θpt1 of the pinion shaft 24 for achieving the predetermined steering characteristic and the target correction amount Δθpt2 of the rotation angle of the pinion shaft 24 for the travel trajectory control are added by an adder 66. The steering angle of the left and right front wheels 10FL, 10FR is controlled based on a target rotation angle θpt which is θpt1+Δθpt2.

However, the vehicle behavior stabilizing control block 60 is supplied only with the target rotation angle θpt1 of the pinion shaft 24 for achieving the predetermined steering characteristic as target rotation angle of the pinion shaft. Accordingly, a target yaw rate γt of the vehicle is calculated on the basis of steering angle corresponding to the target rotation angle θpt1 only, and dose not become a value which reflects the change in steering angle of the left and right front wheels 10FL, 10FR caused by the travel trajectory control.

Therefore, in the conventional travel control device shown in FIG. 3, under the situation where travel trajectory control is executed, turning behavior of the vehicle can not be stabilized in such a manner that the change in steering angle of the left and right front wheels 10FL, 10FR caused by the travel trajectory control is reflected. In contrast, according to the first embodiment, under the situation where travel trajectory control is executed, a target yaw rate γt of the vehicle can be calculated in such a manner that the change in steering angle of the left and right front wheels 10FL, 10FR caused by the travel trajectory control is reliably reflected.

In addition, in such a case where a target yaw rate γt of the vehicle is calculated on the basis of the actual steering angle of the left and right front wheels 10FL, 10FR, a means for detecting the actual steering angle of the left and right front wheels is imperative. In contrast, according to the first embodiment, even in a vehicle which is not provided with a means for detecting the actual steering angle of the left and right front wheels, a target yaw rate γt of the vehicle can be calculated in such a manner that the change in steering angle of the left and right front wheels caused by the travel trajectory control is reliably reflected.

Second Embodiment

Figure 4:
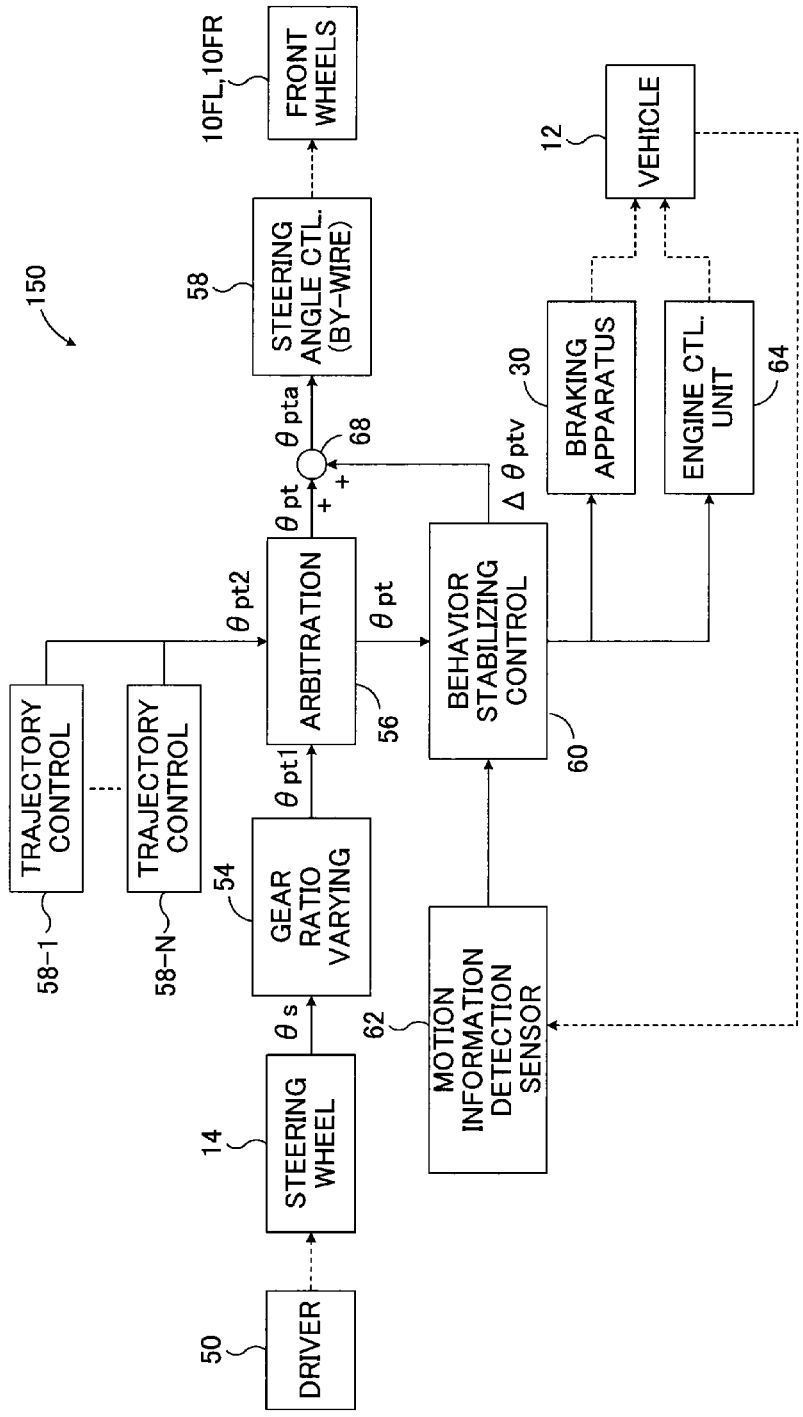
FIG. 4 is a block diagram showing a second embodiment of the travel control device according to the present invention which is applied to a vehicle of a steer-by-wire type and is adapted to execute a vehicle behavior control by controlling a braking-driving force of each vehicle wheel and a steering angle of the front wheels.

FIG. 4 is a block diagram showing a second embodiment of the travel control device according to the present invention which is applied to a vehicle of a steer-by-wire type and is adapted to execute a vehicle behavior control by controlling a braking-driving force of each vehicle wheel and a steering angle of the front wheels.

In the second embodiment, the left and right front wheels 10FL, 10FR are steered in a steer-by-wire manner similar to that of the first embodiment. However, when the turning behavior of the vehicle is unstable, it is stabilized by controlling a steering angle of the left and right front wheels 10FL, 10FR as well as a braking-driving force of each vehicle wheel.

As illustrated in FIG. 4, the information of the arbitrated target rotation angle θpt of the pinion shaft 24 is input to the behavior stabilizing control block 60 and an adder 68. Also, in this embodiment, the behavior stabilizing control block 60 calculates a target yaw rate γt of the vehicle on the basis of the target rotation angle θpt of the pinion shaft 24 arbitrated by the arbitration block 56 and calculates a yaw rate difference Δγ on the basis of the target yaw rate γ t.

When the magnitude of the difference Δγ is equal to or larger in magnitude than the reference value γo, the behavior stabilizing control block 60 calculates a target yaw moment Mt and a target longitudinal force Ft of the vehicle for stabilizing the turning behavior of the vehicle on the basis of the yaw rate difference Δγ. In the embodiment, the behavior stabilizing control block 60 distributes the target yaw moment Mt to a target yaw moment Mbt for the control of braking-driving forces of the vehicle wheels and a target yaw moment Mst for the control of steering angle of the left and right front wheels 10FL, 10FR.

Furthermore, the behavior stabilizing control block 60 calculates target braking-driving forces Fwti of the vehicle wheels on the basis of the target yaw moment Mbt to control braking-driving forces of the vehicle wheels based thereon and calculates a target correction amount Δθptv of the rotation angle of the pinion shaft 24 on the bases of the steering angle of the left and right front wheels 10FL, 10FR for achieving the target yaw moment Mst.

The information of the target correction amount Δθptv is input to the adder 68. The adder 68 adds the target rotation angle θpt and the target correction amount Δθpt to calculate a modified target rotation angle θpta, which is input to the steering angle control block 58. The steering angle control block 58 controls the electric motor 28 based on the modified target rotation angle θpta so that rotation angle θp of the pinion shaft 24 conforms to the modified target rotation angle θpta. Thus, the steering angle of the left and right front wheels 10FL, 10FR is controlled to a steering angle θwta corresponding to the modified target rotation angle θpta.

According to the second embodiment, arbitration is made between the target rotation angle θpt1 of the pinion shaft 24 for achieving the predetermined steering characteristic and the target rotation angle θpt2 of the pinion shaft 24 for executing the travel trajectory control. A target yaw rate γt of the vehicle is calculated on the basis of steering angle θwt corresponding to the arbitrated target rotation angle θpt and the like, and both the braking-driving forces of the vehicle wheels and the steering angle of the left and right front wheels 10FL, 10FR are controlled so that the yaw rate difference Δγ between the target yaw rate γt and an actual yaw rate γ of the vehicle is reduced in magnitude to stabilize the turning behavior of the vehicle 12.

Figure 5:
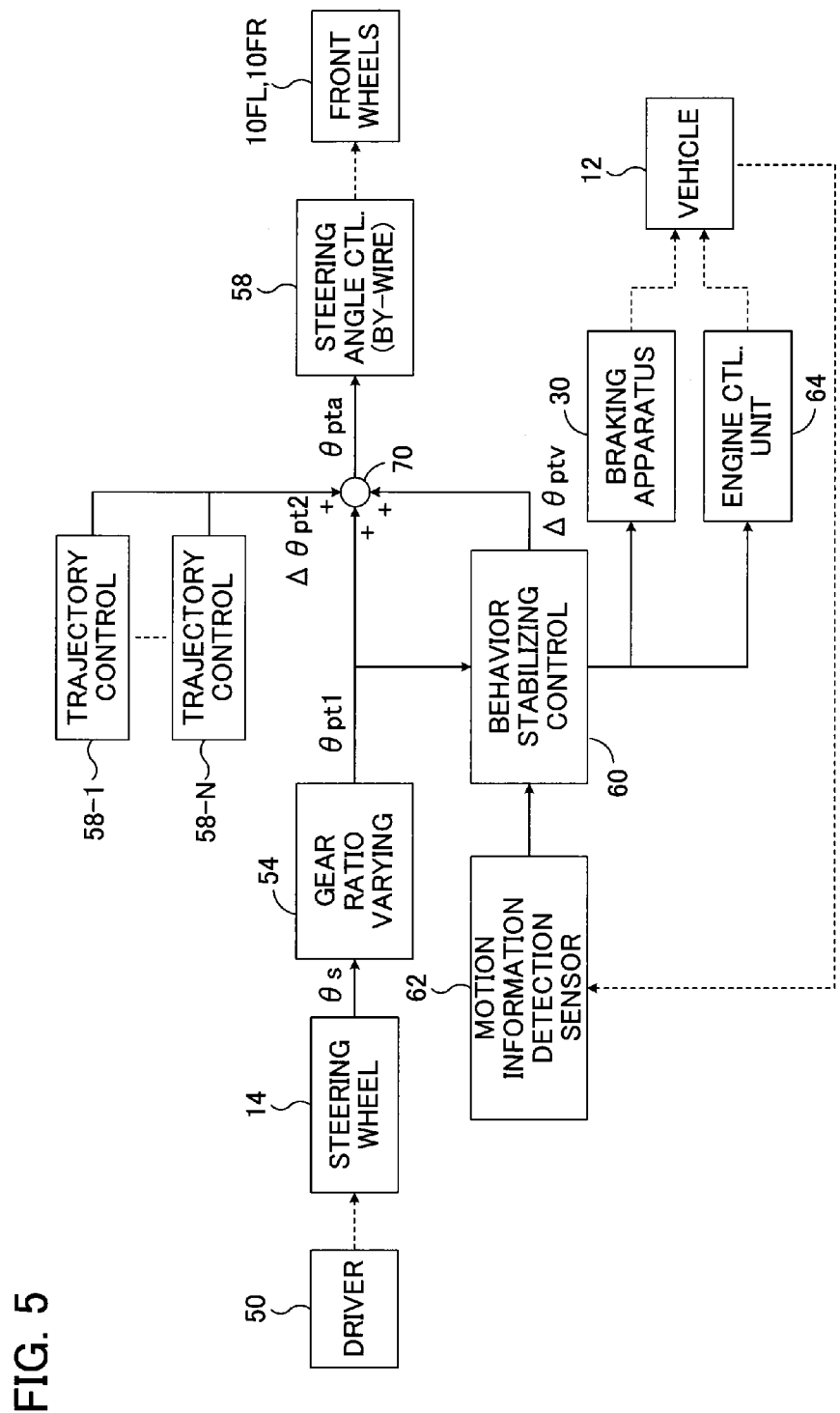
FIG. 5 is a block diagram showing the control executed in a conventional travel control device which is applied to a vehicle of a steer-by-wire type and is adapted to execute a vehicle behavior control by controlling a braking-driving force of each vehicle wheel and a steering angle of the front wheels.

FIG. 5 is a block diagram showing a control in a conventional travel control device which is applied to a vehicle of a steer-by wire type and is adapted to execute a vehicle behavior control by controlling a braking-driving force of each vehicle wheel and a steering angle of the front wheels.

In the conventional travel control device shown in FIG. 5, the target rotation angle θpt1 of the pinion shaft 24 for achieving the predetermined steering characteristic, the target correction amount Δθpt2 of the rotation angle of the pinion shaft 24 for the travel trajectory control and the target correction amount Δθptv of the rotation angle of the pinion shaft 24 for stabilizing turning behavior of the vehicle are added by an adder 70. The steering angle of the left and right front wheels 10FL, 10FR is controlled based on a modified target rotation angle θpta which is the result of the adding, i.e. θpt1+Δθpt2+Δθptv.

However, the behavior stabilizing control block 60 is supplied only with the target rotation angle θpt1 of the pinion shaft 24 for achieving the predetermined steering characteristic as target rotation angle of the pinion shaft. Accordingly, a target yaw rate γt of the vehicle is calculated on the basis of steering angle corresponding to the target rotation angle θpt1 only, and dose not become a value which reflects the change in steering angle of the left and right front wheels 10FL, 10FR caused by the travel trajectory control.

Therefore, in the conventional travel control device shown in FIG. 5, under the situation where a travel trajectory control is executed, the turning behavior of the vehicle can not be stabilized in such a manner that the change in steering angle of the left and right front wheels 10FL, 10FR caused by the travel trajectory control. In contrast, according to the second embodiment, under the situation where a travel trajectory control is executed, as in the case of the first embodiment, a target yaw rate γt of the vehicle can be calculated in such a manner that the change in steering angle of the left and right front wheels 10FL, 10FR caused by the travel trajectory control is reliably reflected.

According to the second embodiment, a target yaw rate γt of the vehicle can be calculated in such a manner that the steering operation by the driver is more reliably reflected as compared with a case where a target yaw rate γt of the vehicle is calculated on the basis of the actual steering angle of the left and right front wheels 10FL, 10FR. Under the situation where a vehicle behavior control is executed by means of the steering angle control, a target yaw rate γt of the vehicle can be calculated without being affected by the vehicle behavior control executed by means of the steering angle control. Accordingly, vehicle turning behavior can be stabilized in such a manner that the steering operation by the driver is effectively reflected while eliminating the influence of the vehicle behavior control executed by means of the steering angle control.

According to the second embodiment, the arbitrated target rotation angle θpt and the target correction amount Δθptv of the rotation angle of the pinion shaft 24 for stabilizing the turning behavior of the vehicle are added to calculate a modified target rotation angle θpta. The steering angle of the left and right front wheels 10FL, 10FR is controlled based on the modified target rotation angle θpta. Accordingly, vehicle turning behavior can be more effectively stabilized as compared with a case where the vehicle behavior control is executed only by controlling a braking-driving force of each vehicle wheel, while eliminating the influence of the vehicle behavior control executed by means of the steering angle control.

Third Embodiment

Figure 6:
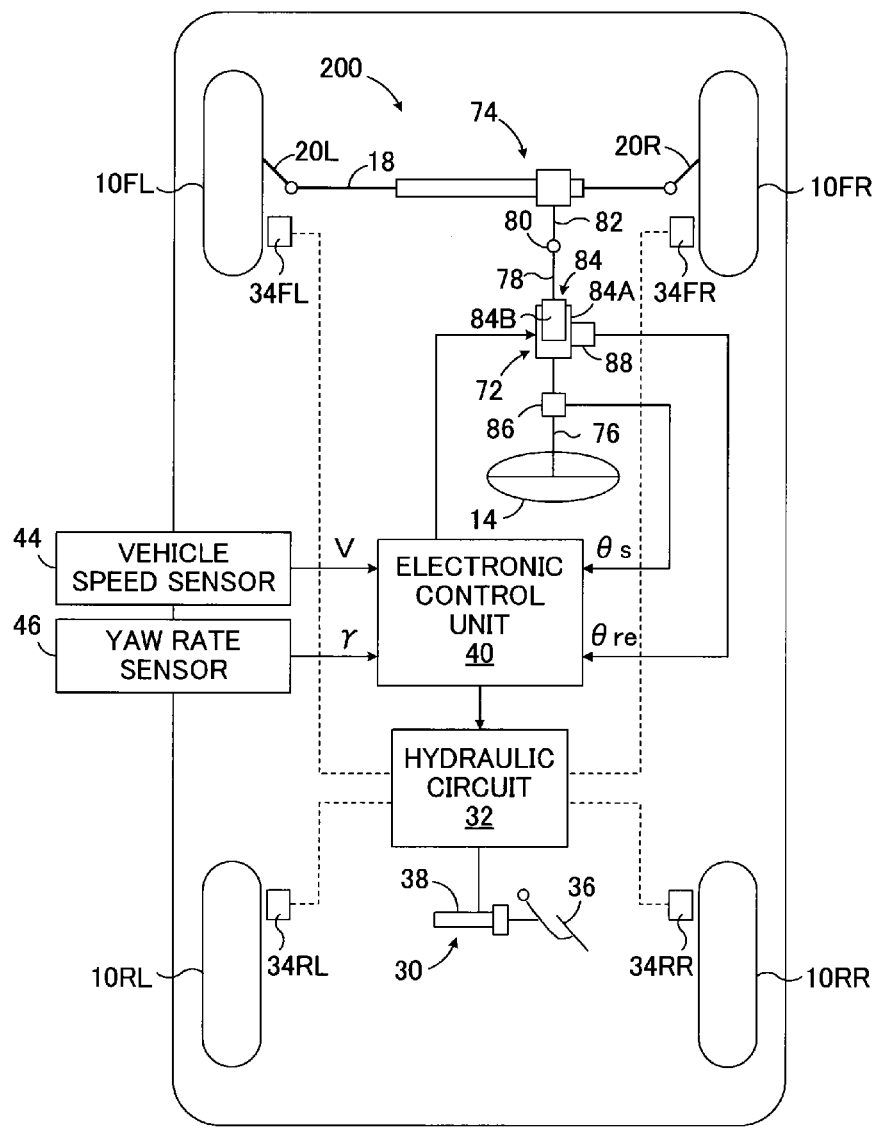
FIG. 6 is a schematic diagram showing a third embodiment of the travel control device according to the present invention which is applied to a vehicle of a semi-steer-by-wire type and is adapted to execute a vehicle behavior control by controlling a braking-driving force of each vehicle wheel and a steering angle of the front wheels.
Figure 7:
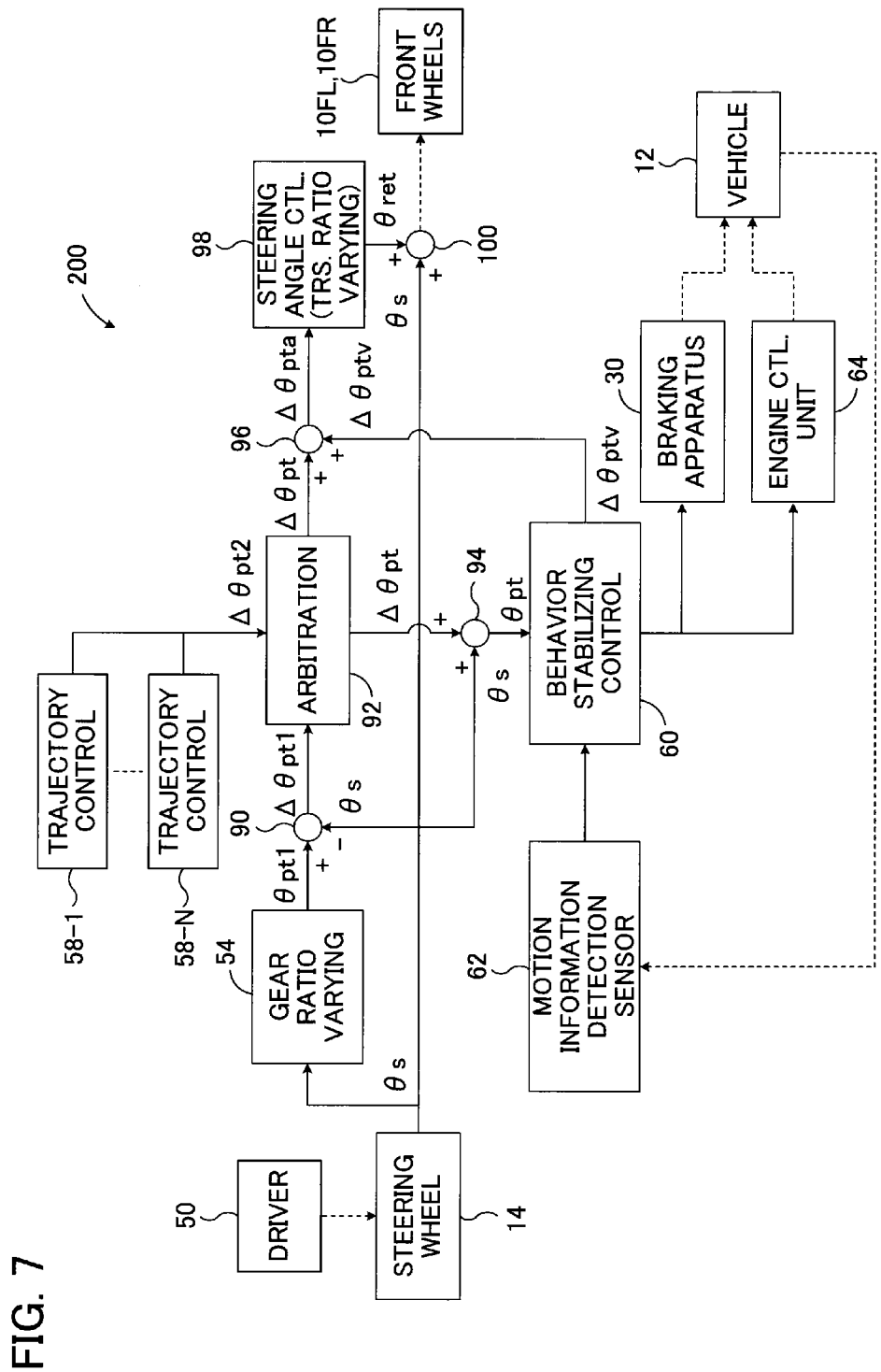
FIG. 7 is a block diagram showing the control executed in the third embodiment.

FIG. 6 is a schematic diagram showing a third embodiment of the travel control device according to the present invention which is applied to a vehicle of a semi-steer-by-wire type and is adapted to execute a vehicle behavior control by controlling a braking-driving force of each vehicle wheel and a steering angle of the front wheels. FIG. 7 is a block diagram showing the control executed in the third embodiment.

In FIG. 6, 200 denotes the entire travel control device according to the third embodiment. The travel control device 200 comprises a steering transmission ratio varying unit (VGRS) 72. The steering transmission ratio varying unit 72 is controlled by the steering angle control section of the electronic control unit 40.

In FIG. 6, the left and right front wheels 10FL and 10FR, which are the steerable wheels, are steered by an electric power steering unit 74 of a rack and pinion type via a rack bar 18 and tie rods 20L, 20R. The electric power steering unit 74 is driven in response to an operation of a steering wheel 14 by a driver.

The steering wheel 14 is drivingly connected to a pinion shaft 82 of the electric power steering unit 74 via an upper steering shaft 76, the steering transmission ratio varying unit 72, a lower steering shaft 78, and a universal joint 80. In the third embodiment shown in the figure, the steering transmission ratio varying unit 72 includes an electric motor 84 for conducting supplementary steering driving which is controlled by the steering angle control section of the electronic control unit 40. The electric motor 84 has a housing 84A linked to a lower end of the upper steering shaft 76 and a rotor 84B linked to an upper end of the lower steering shaft 78.

As is apparent from the above, the steering transmission ratio varying unit 72 rotates the lower steering shaft 78 relative to the upper steering shaft 76 so as to vary the ratio of steering angle of the left and right front wheels 10FL and 10FR relative to the rotation angle of the steering wheel 14, i.e. a steering transmission ratio and to drive, for supplementary steering, the left and right front wheels 10FL and 10FR relative to the steering wheel 14.

In particular, the steering transmission ratio varying unit 72 usually rotates the lower steering shaft 78 relative to the upper steering shaft 76 by means of the electric motor 84 so that a steering gear ratio which is a reverse number of steering transmission ratio conforms to a gear ratio for achieving the predetermined steering characteristic. When supplementary steering for executing the behavior control is required, the steering transmission ratio varying unit 72 positively rotates the lower steering shaft 78 relative to the upper steering shaft 76 by means of the electric motor 84, to automatically steer the left and right front wheels 10FL and 10FR without depending on steering operation by a driver.

It is to be understood that while the power steering unit 74 may be either of a hydraulic power steering unit and an electric power steering unit, the latter is preferably selected as a power steering unit so that a supplementary steering torque is produced which reduce a reaction torque that is generated by supplementary steering conducted by the steering transmission ratio varying unit 72 and is transmitted to the steering wheel 14. For example, it may preferably be an electric power steering unit located concentric with the rack bar which includes an electric motor and a mechanism that converts the rotational torque of the electric motor into a force in a reciprocating direction of the rack bar 18 such as a ball-screw type conversion mechanism.

As in the case of the other embodiments, braking forces of the individual wheels are controlled through the control of braking pressures in wheel cylinders 34FL, 34FR, 34RL and 34RR performed by the hydraulic circuit 32 of the braking apparatus 30.

In the third embodiment, the upper steering shaft 76 is provided with a steering angle sensor 86 which detects a rotation angle of the upper steering shaft as a steering angle $\theta s$. The steering transmission ratio varying unit 72 is provided with a rotation angle sensor 88 which detects a relative rotation angle $\theta re$ of the lower steering shaft 78 relative to the upper steering shaft 76 by detecting a relative rotation angle between the housing 84A and the rotor 84B. The outputs of these sensors are supplied to the steering angle control section of the electronic control unit 40. It is to be noted that the rotation angle sensor 88 may be replaced by a sensor which detects a rotation angle $\theta p$ of the pinion shaft 82 or the lower steering shaft 78 and a relative rotation angle $\theta re$ may be derived as a steering angle difference $\theta p - \theta s$.

In the third embodiment, as illustrated in FIG. 7, steering angle $\theta s$ is subtracted from a target rotation angle $\theta pt1$ of the pinion shaft 82 for achieving the predetermined steering characteristic by an adder 90. Steering angle $\theta s$ is equal to the rotation angle $\theta p$ of the pinion shaft 82 at a time when the variable steering gear ratio varying control for achieving the predetermined steering characteristic is not executed. Accordingly, the subtraction by the adder 90 calculates a target rotation angle correction amount $\Delta\theta pt1$ of the pinion shaft 82 for achieving the predetermined steering characteristic. A target correction amount $\Delta\theta pt2$ of the rotation angle of the pinion shaft 82 for the travel trajectory control is calculated by one of trajectory control blocks 58-1 to 58-N.

Arbitration is conducted by an arbitration block 92 between the target rotation angle correction amount $\Delta\theta pt1$ of the pinion shaft 82 for achieving the predetermined steering characteristic and the target correction amount $\Delta\theta pt2$ of the rotation angle of the pinion shaft 82 for the travel trajectory control to calculate an arbitrated target correction amount $\Delta\theta pt$ of the rotation angle of the pinion shaft 82. It is to be noted that the arbitration by the arbitration block 92 may be conducted in a similar manner to that of the arbitration block 56 except that rotation angle $\theta pt0$ is not included.

The arbitrated target correction amount $\Delta\theta pt$ of the rotation angle of the pinion shaft 82 is added to steering angle $\theta s$ by an adder 94, which produces a target rotation angle $\theta pt$ of the pinion shaft 82 for achieving the predetermined steering characteristic and the prescribed travel trajectory control. The information of the target rotation angle $\theta pt$ of the pinion shaft 82 is input to the behavior stabilizing control block 60.

The behavior stabilizing control block 60 calculates a target yaw rate $\gamma t$ of the vehicle on the basis of steering angle $\theta wt$ corresponding to the arbitrated target rotation angle $\theta pt$ of the pinion shaft 82, a lateral acceleration Gy of the vehicle and the like. In addition, when the magnitude of the difference $\Delta\gamma$ between the target yaw rate $\gamma t$ and an actual yaw rate $\gamma$ of the vehicle is equal to or larger in magnitude than the reference value $\gamma o$, the behavior stabilizing control block 60 calculates a target yaw moment Mt and a target longitudinal force Ft of the vehicle for stabilizing the turning behavior of the vehicle on the basis of the yaw rate difference $\Delta\gamma$. Furthermore, the behavior stabilizing control block 60 distributes the target yaw moment Mt to a target yaw moment Mbt for the control of a braking-driving forces of the vehicle wheels and a target yaw moment Mst for the control of a steering angle of the left and right front wheels.

In this embodiment, the behavior stabilizing control block 60 calculates target braking-driving forces Fwti of the vehicle wheels on the basis of the target yaw moment Mbt and the target longitudinal force Ft, and controls the braking apparatus 30 and an engine control unit 64 based on the target braking-driving forces to control braking-driving forces of the vehicle wheels. In addition, the behavior stabilizing control block 60 calculates a target correction amount $\Delta\theta ptv$ of the rotation angle of the pinion shaft 82 on the bases of the target yaw moment Mst for achieving the target yaw moment.

The arbitrated target correction amount $\Delta\theta pt$ of the rotation angle of the pinion shaft 82 and the target correction amount $\Delta\theta ptv$ of the rotation angle of the pinion shaft 82 for the behavior control are added by an adder 96. Thus, a modified target correction amount $\Delta\theta pta$ of the rotation angle of the pinion shaft 82 is calculated and input to a steering angle control block 98. The steering angle control block 98 calculates, based on the modified target correction amount $\Delta\theta pta$, a target relative rotation angle $\theta ret$ of the steering transmission ratio varying unit 72 for correcting the rotation angle $\theta p$ of the pinion shaft 82 by the modified target correction amount $\Delta\theta pta$. It is to be noted that the target relative rotation angle $\theta ret$ may be the same as the modified target correction amount $\Delta\theta pta$ or a value of modified target correction amount $\Delta\theta pta$ multiplied by a gain not larger than 1.

As illustrated as an adder 100 in FIG. 7, the steering transmission ratio varying unit 72 controls the electric motor 84 so that rotation angle of the pinion shaft 82 conforms to a sum of the steering angle $\theta s$ and the target relative rotation angle $\theta ret$. Thus, the steering angle of the left and right front wheels 10FL, 10FR is controlled to a steering angle $\theta wt$ corresponding to the sum of the steering angle $\theta s$ and the target relative rotation angle $\theta ret$.

According to the third embodiment, arbitration is conducted between the target rotation angle correction amount $\Delta\theta pt1$ of the pinion shaft 82 for achieving the predetermined steering characteristic and the target correction amount $\Delta\theta pt2$ of the rotation angle of the pinion shaft 82 for the travel trajectory control. The arbitrated target correction amount $\Delta\theta pt$ and the steering angle $\theta s$ are added to calculate a target rotation angle $\theta pt$ of the pinion shaft 82 for achieving the predetermined steering characteristic and the prescribed travel trajectory control. In addition, a target yaw rate $\gamma t$ of the vehicle is calculated on the basis of steering angle $\theta wt$ corresponding to the arbitrated target rotation angle $\theta pt$ and the like, and braking-driving forces of the vehicle wheels and the steering angle of the left and right front wheels 10FL, 10FR are controlled so that the difference $\Delta\gamma$ between the target yaw rate $\gamma t$ and an actual yaw rate $\gamma$ of the vehicle is reduced in magnitude, which stabilizes the turning behavior of the vehicle 12.

According to the third embodiment, as in the first and second embodiments, when the travel trajectory control is executed, a target yaw rate $\gamma t$ of the vehicle can be calculated in such a manner that the change in steering angle of the left and right front wheels 10FL, 10FR caused by the travel trajectory control is reliably reflected. In addition, as in the first embodiment, even in a vehicle which is not provided with a means for detecting the actual steering angle of the left and right front wheels, a target yaw rate $\gamma t$ of the vehicle can be calculated in such a manner that the change in steering angle of the left and right front wheels caused by the travel trajectory control is reflected.

According to the third embodiment, under the situation where the vehicle behavior control is executed by means of the steering angle of the left and right front wheels being controlled by the steering transmission ratio varying unit 72, a target yaw rate γt of the vehicle can be calculated without being affected by the behavior control executed by controlling the steering angle. Therefore, in the third embodiment also, vehicle behavior can be stabilized in such a manner that the steering operation by the driver is effectively reflected while eliminating the influence of the behavior control executed by means of the steering angle control.

According to the third embodiment, the arbitrated target correction amount Δθpt and the target correction amount Δθptv for the behavior control are added to calculate a modified target correction amount Δθpta of the rotation angle of the pinion shaft 82. The steering angle of the left and right front wheels 10FL, 10FR is controlled based on the target rotation angle of the pinion shaft 82 which is θret+θs, i.e. the sum of target relative rotation angle θret of the steering transmission ratio varying unit 72 derived from the modified target correction amount Δθpta and the steering angle θs. Therefore, the vehicle turning behavior can be more effectively stabilized as compared with the case where the vehicle behavior control is executed only by controlling a braking-driving force of each vehicle wheel, while eliminating the influence of the vehicle behavior control executed by the steering angle control utilizing the steering transmission ratio varying unit 72.

Fourth Embodiment

Figure 8:
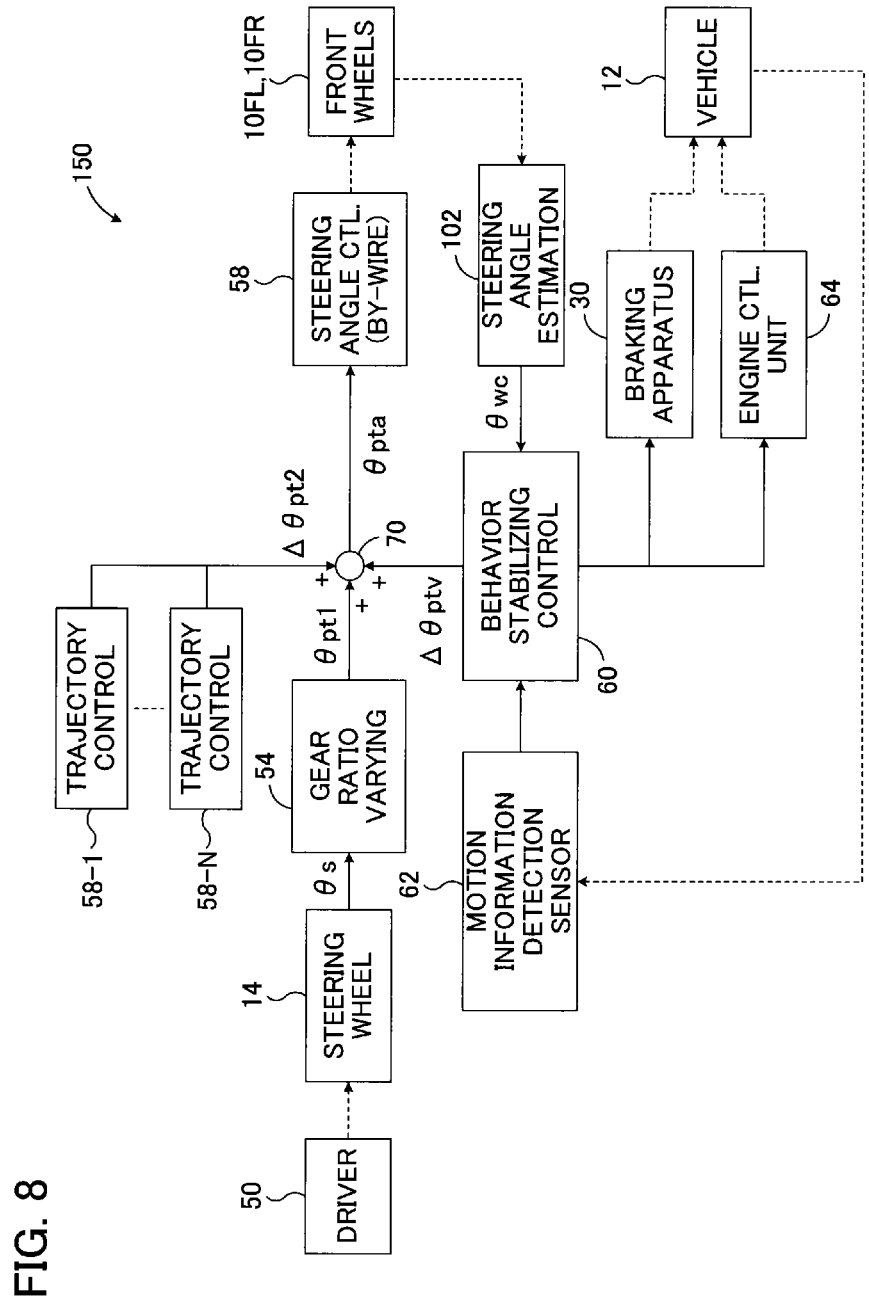
FIG. 8 is a block diagram showing a fourth embodiment of the travel control device according to the present invention which is applied to a vehicle of a steer-by-wire type and is adapted to execute a vehicle behavior control by controlling a braking-driving force of each vehicle wheel and a steering angle of the front wheels.

FIG. 8 is a block diagram showing a fourth embodiment of the travel control device according to the present invention which is applied to a vehicle of a steer-by-wire type and is adapted to execute a vehicle behavior control by controlling a braking-driving force of each vehicle wheel and a steering angle of the front wheels.

In the fourth embodiment, as in the case of the conventional travel control device shown in FIG. 5, the target rotation angle θpt1 of the pinion shaft 24 for achieving the predetermined steering characteristic, the target correction amount Δθpt2 of the rotation angle of the pinion shaft 24 for the travel trajectory control and the target correction amount Δθptv of the rotation angle of the pinion shaft 24 for stabilizing turning behavior of the vehicle are added by the adder 70. The steering angle of the left and right front wheels 10FL, 10FR is controlled based on a modified target rotation angle θpta which is the result of the adding, i.e. θpt1+Δθpt2+Δθptv.

A steering angle θwc of the left and right front wheels which is used in the vehicle behavior control for stabilizing the turning behavior of the vehicle is estimated by a steering angle estimation block 102. The steering angle estimation block 102 includes a means for detecting an actual steering angle θwa of the left and right front wheels. In addition, the steering angle estimation block 102 calculates a correction amount Δθwc of steering angle of the left and right front wheels which corresponds to the target correction amount Δθptv of the rotation angle of the pinion shaft 24 for stabilizing the turning behavior of the vehicle. Furthermore, the steering angle estimation block 102 subtracts the correction amount Δθwc of steering angle from the detected actual steering angle θwa of the left and right front wheels to calculate a steering angle θm of the left and right front wheels for achieving the behavior control. The information of the steering angle θm of the left and right front wheels is input to the behavior stabilizing control block 60.

In contrast to the conventional travel control device shown in FIG. 5, the behavior stabilizing control block 60 is not supplied with the information of target rotation angle θpt1 of the pinion shaft 24 for achieving the predetermined steering characteristic. The behavior stabilizing control block 60 calculates a target yaw rate γt of the vehicle on the basis of steering angle θwc of the left and right front wheels input from the steering angle estimation block 102 according to the following equation 2.

$$\gamma t = \left(\frac{\theta wc}{L} - KhGy\right)V \qquad (2)$$

It is to be understood that the control of the steering angle of the left and right front wheels 10FL, 10FR conducted by the steering angle control block 58 and the behavior stabilizing control conducted by the behavior stabilizing control block 60 based on a target yaw rate γt of the vehicle are executed in the same manner as that of the above-mentioned second embodiment.

Fifth Embodiment

Figure 9:
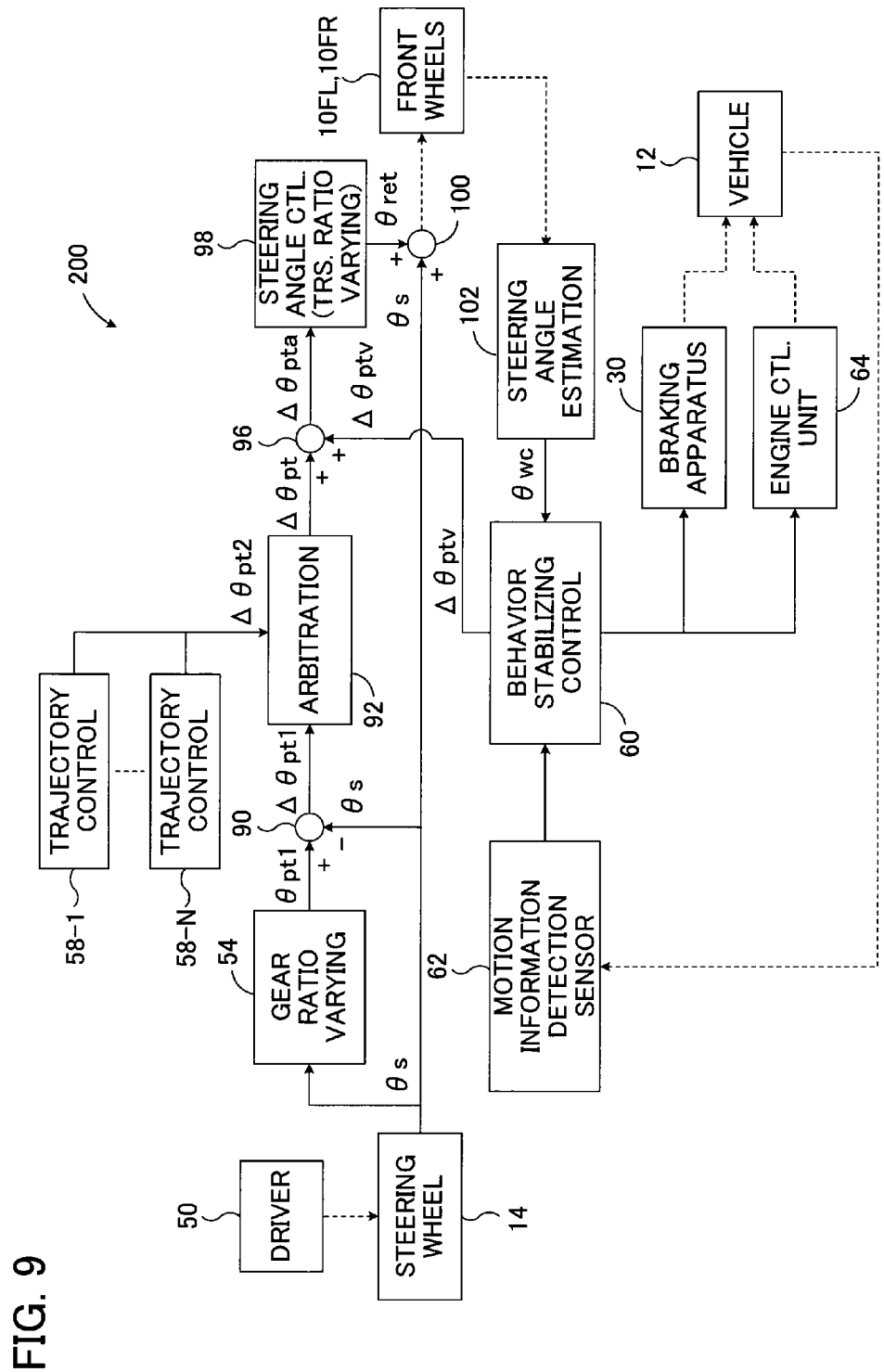
FIG. 9 is a block diagram showing a fifth embodiment of the travel control device according to the present invention which is applied to a vehicle of a semi-steer-by-wire type and is adapted to execute a vehicle behavior control by controlling a braking-driving force of each vehicle wheel and a steering angle of the front wheels.

FIG. 9 is a block diagram showing a fifth embodiment of the travel control device according to the present invention which is applied to a vehicle of a semi-steer-by-wire type and is adapted to execute a vehicle behavior control by controlling a braking-driving force of each vehicle wheel and a steering angle of the front wheels.

In the fifth embodiment, the arbitration in the arbitration block 92, the calculation of the target relative rotation angle θret in the steering angle control block 98, the control of the electric motor 84 by means of the steering transmission ratio varying unit 72 (the adder 100) are each conducted in the same manners as those of the third embodiment.

In the fifth embodiment, however, the adder 94 in the third embodiment is not provided and, accordingly, the behavior stabilizing control block 60 is not supplied with the information of a target rotation angle θpt of the pinion shaft 82.

In the fifth embodiment, as in the fourth embodiment, the steering angle estimation block 102 is provided which includes a means for detecting an actual steering angle θwa of the left and right front wheels. The steering angle estimation block 102 calculates a correction amount Δθwc of steering angle of the left and right front wheels which corresponds to the target correction amount Δθptv of the rotation angle of the pinion shaft 82 for stabilizing the turning behavior of the vehicle. In addition, the steering angle estimation block 102 subtracts the correction amount Δθwc of steering angle from an actual steering angle θwa to calculate a steering angle θwc of the left and right front wheels for achieving the vehicle behavior control.

The behavior stabilizing control block 60 calculates a target yaw rate γt of the vehicle on the basis of the steering angle θwc of the left and right front wheels input from the steering angle estimation block 102 according to the above-described equation 2 and executes the vehicle behavior stabilizing control based on the target yaw rate γt in the same manner as that of the fourth embodiment.

The target correction amount Δθptv of the rotation angle of the pinion shaft 82 for the behavior control calculated by the behavior stabilizing control block 60 is added to a arbitrated target correction amount Δθpt of the rotation angle of the pinion shaft 82 by the adder 96, which calculates a modified target correction amount $\Delta\theta\text{pta}$ of the rotation angle of the pinion shaft 82.

Thus, according to the fourth and fifth embodiments, steering angle $\theta\text{wc}$ of the left and right front wheels for achieving the vehicle behavior control is calculated by subtracting the correction amount $\Delta\theta\text{wc}$ of steering angle for achieving the vehicle behavior control from an actual steering angle $\theta\text{wa}$. Accordingly, steering angle $\theta\text{wc}$ of the left and right front wheels for achieving the vehicle behavior control is a value which reflects the change in steering angle for achieving the predetermined steering characteristic and the change in steering angle caused by the travel trajectory control but is not affected by the vehicle behavior control.

Therefore, according to the fourth and fifth embodiments, as in the second and third embodiments, when the travel trajectory control is executed, a target yaw rate $\gamma\text{t}$ of the vehicle can be calculated in such a manner that the change in steering angle of the left and right front wheels 10FL, 10FR caused by the travel trajectory control is reliably reflected. Accordingly, the vehicle behavior control can be executed in such a manner that the change in steering angle of the left and right front wheels caused by the travel trajectory control is reliably reflected.

According to the fourth and fifth embodiments, as compared with the case where a target yaw rate $\gamma\text{t}$ of the vehicle is calculated on the basis of actual steering angle of the left and right front wheels, a target yaw rate $\gamma\text{t}$ of the vehicle can be calculated in such a manner that the steering operation by a driver is effectively reflected without being affected by the behavior control conducted by controlling the steering angle. Therefore, the turning behavior of the vehicle can be stabilized in such a manner that the steering operation by the driver is effectively reflected while eliminating the influence of the vehicle behavior control conducted by means of the steering angle control.

According to the fourth embodiment, the target rotation angle $\theta\text{pt}1$ of the pinion shaft 24 for achieving the predetermined steering characteristic, the target correction amount $\Delta\theta\text{pt}2$ of the rotation angle of the pinion shaft 24 for the travel trajectory control and the target correction amount $\Delta\theta\text{ptv}$ of the rotation angle of the pinion shaft 24 for stabilizing the turning behavior of the vehicle are added to calculate a modified target rotation angle $\theta\text{pta}$. The steering angle of the left and right front wheels 10FL, 10FR is controlled based on a target rotation angle which is the modified target rotation angle $\theta\text{pta}$.

According to the fifth embodiment, the target rotation angle correction amount $\Delta\theta\text{pt}1$ of the pinion shaft 82 for achieving the predetermined steering characteristic, the target correction amount $\Delta\theta\text{pt}2$ of the rotation angle for the travel trajectory control and the target correction amount $\Delta\theta\text{ptv}$ for stabilizing the turning behavior of the vehicle are added to calculate a modified target correction amount $\Delta\theta\text{pta}$ of the rotation angle. The steering angle of the left and right front wheels 10FL, 10FR is controlled based on a target relative rotation angle of the steering transmission ratio varying unit 72 which is calculated based on the modified target correction amount $\Delta\theta\text{pta}$ of the rotation angle.

Therefore, according to the fourth and fifth embodiments, the turning behavior of the vehicle can be stabilized in such a manner that the steering operation by the driver is more effectively reflected as compared with the case where the vehicle behavior control is conducted only by controlling a braking-driving force of each vehicle wheel while eliminating the influence of the vehicle behavior control conducted by means of the steering angle control.

In particular, according to the fourth embodiment, as is understood from comparison of FIGS. 4 and 8, the arbitration in the arbitration block 56 can be replaced by the simple addition in the adder 70 and the calculation in steering angle estimation block 102 is simple. Accordingly, the configuration can be made simpler than that of the above-described second embodiment.

Figure 10:
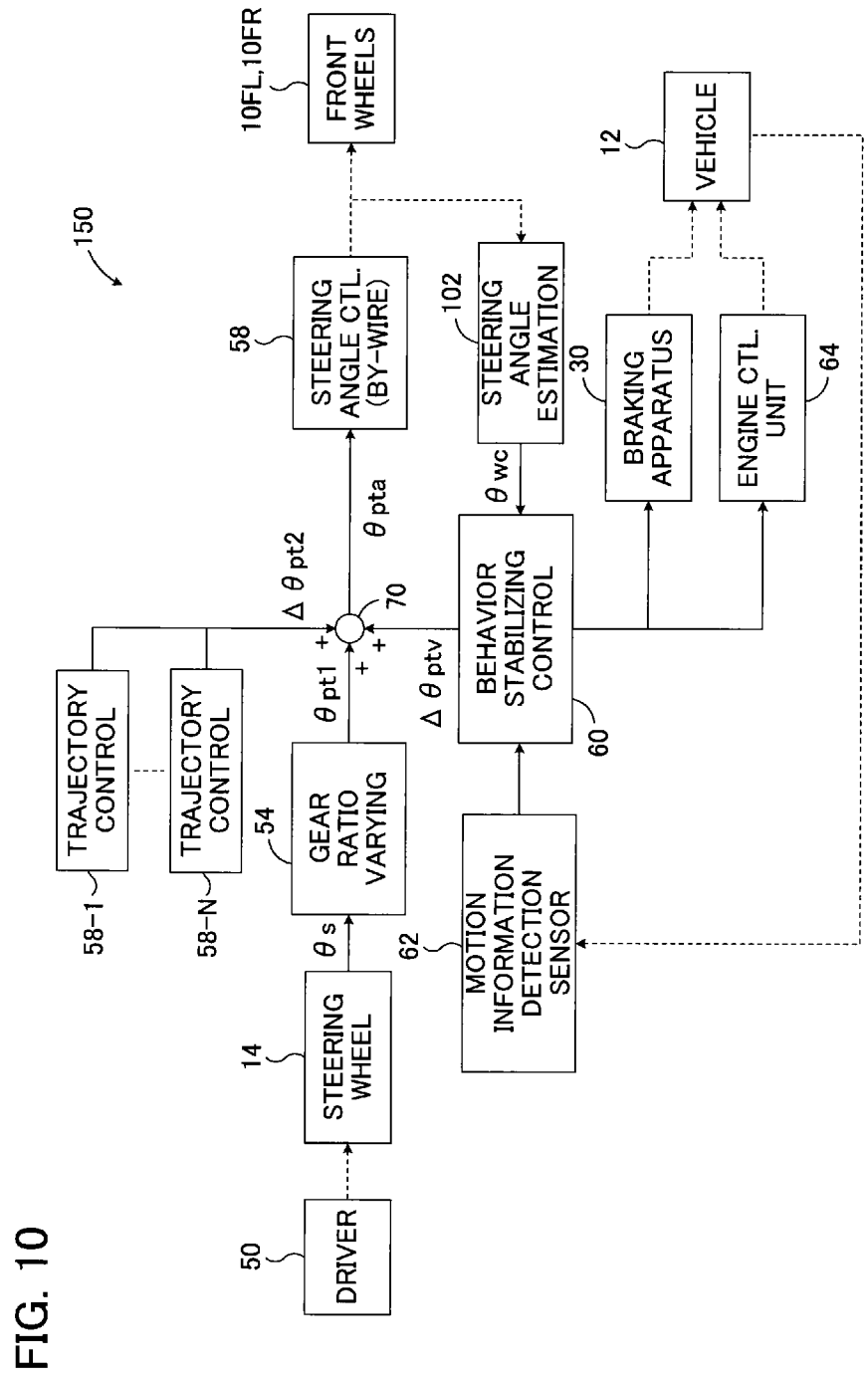
FIG. 10 is a block diagram showing the control executed in a modification of the fourth embodiment.
Figure 11:
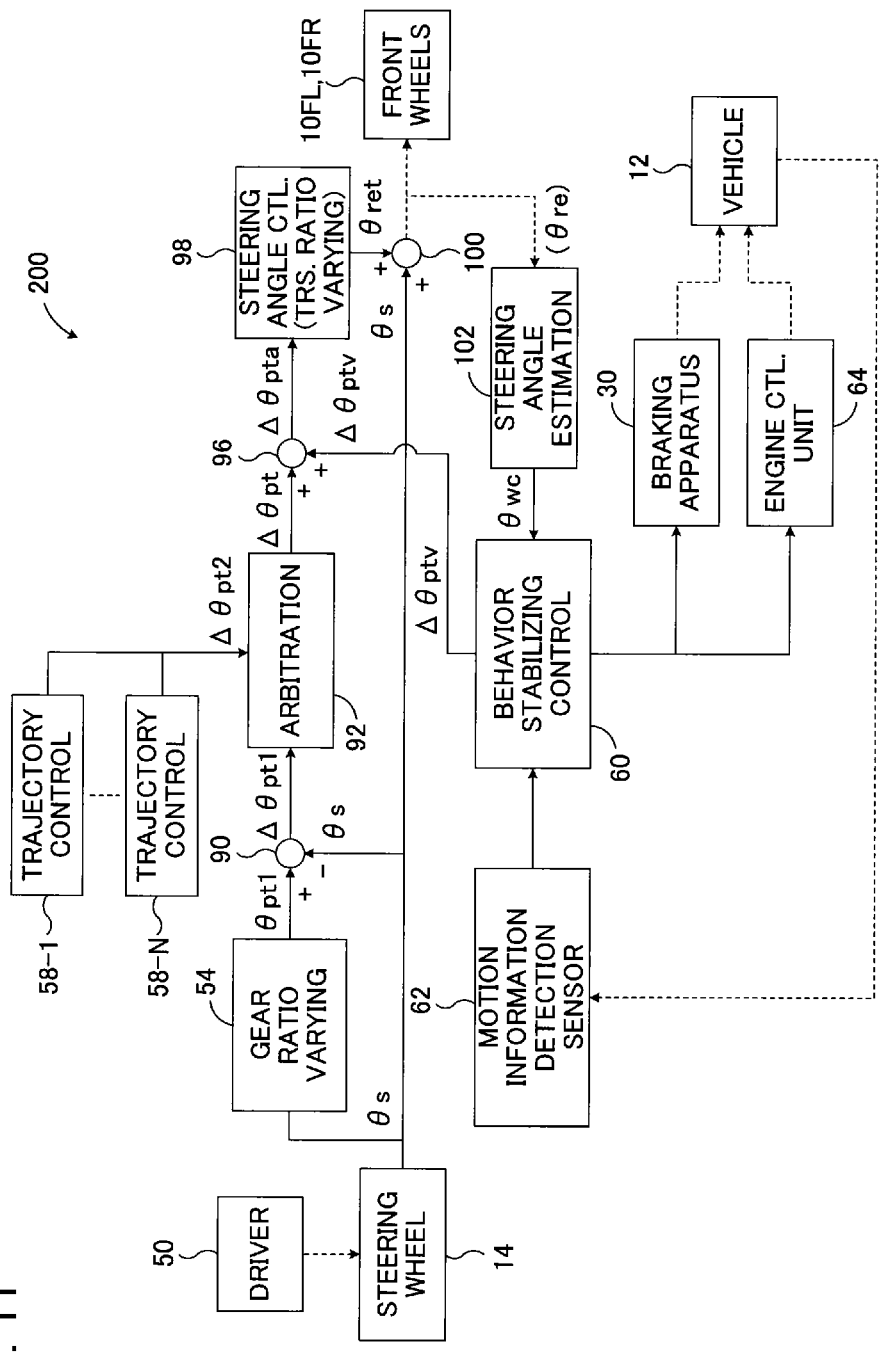
FIG. 11 is a block diagram showing the control executed in a modification of the fifth embodiment.

In the fourth and fifth embodiments, the steering angle estimation block 102 includes a means for detecting an actual steering angle $\theta\text{wa}$ of the left and right front wheels. In addition, the steering angle estimation block 102 subtracts the correction amount $\Delta\theta\text{wc}$ of steering angle from the actual steering angle $\theta\text{wa}$ to calculate a steering angle $\theta\text{wc}$ of the left and right front wheels for achieving the vehicle behavior control. However, as shown in FIGS. 10 and 11 which illustrate modifications of the fourth and fifth embodiments, respectively, actual steering angle $\theta\text{wa}$ may be estimated on the basis of the operation amount of a means for changing the steering angle of the left and right front wheels 10FL, 10FR, i.e. the operation amount of the electric motor 28 or the steering transmission ratio varying unit 72.

While the present invention has been described with reference to the above embodiments, it will be apparent to those skilled in the art that the present invention is not limited thereto, but may be embodied in various other forms without departing from the scope of the invention.

For example, in the above-described embodiments, the value input to the steering angle control blocks 58 and 98, i.e. a target turning state quantity of the steering angle control is a target rotation angle of the pinion shaft or a target correction amount of the rotation angle of the pinion shaft. However, a target turning state quantity of the steering angle control may be any one of a target yaw rate of the vehicle, a target steering angle of steering wheels, a target control amount of steering angle control means (for example, the electric motor 28 or the steering transmission ratio varying unit 72), and a target steering operation amount of a driver.

While in the above-described embodiments, the turning of the vehicle in the travel trajectory control is executed by controlling steering angle of the left and right front wheels 10FL, 10FR, it may be modified to be executed by controlling both steering angle of the left and right front wheels 10FL, 10FR and a braking-driving forces of each vehicle wheel.

In the above-described embodiments, a difference $\Delta\gamma$ between the target yaw rate $\gamma\text{t}$ and an actual yaw rate $\gamma$ of the vehicle is calculated, and the turning behavior of the vehicle is stabilized by controlling either a braking-driving force of each vehicle wheel or both a braking-driving force of each vehicle wheel and the steering angle of the left and right front wheels. However, the turning behavior control of the vehicle may be executed in any manner, so long as a target turning state quantity for rendering a turning state to a target turning state is derived and the turning state of the vehicle is controlled based on the target turning state quantity.

For example, a feed-forward control amount may be added in addition to a feed-back control amount for reducing yaw rate difference $\Delta\gamma$ and the control of a braking-driving force of each vehicle wheel may be executed by controlling the braking only.

Furthermore, although, in the above-described embodiments, the steering angle of the left and right front wheels is controlled, the travel control device of the present invention may be applied to a vehicle in which the steering angle of the left and right rear wheels is controlled in addition to that of the left and right front wheels.

In particular, in the case where the steering angles of front and rear wheels are controlled in a steer-by-wire manner, a target steering angle of rear wheels are as well calculated and the arbitration by the arbitration block 56 is conducted on both front and rear wheels. In the case where the behavior control of the vehicle is executed by controlling steering angles of front and rear wheels as well, correction amounts of steering angles of the front and rear wheels for the behavior control are calculated by, for example, distributing a target moment Mst to the front and rear wheels, and, for the front and rear wheels, modified target values are set to the sum of the correction amounts for the behavior control and arbitrated target values.

In the case where the steering angle of front wheels is controlled in a semi-steer-by-wire manner and the steering angle of rear wheels is controlled in a steer-by-wire manner, the front wheel may be controlled in the same manner as that of the third embodiment and the rear wheel may be controlled in the same manner as in the case where front and rear wheels are controlled in a steer-by-wire manner

The invention claimed is:

1. An electronic control unit for a vehicle, the electronic control unit programmed to:
   alter a relationship between an amount of steering operation of a driver of the vehicle and a steering angle of steerable wheels of the vehicle without actuating a steering input unit which is operated by the driver,
   calculate a first target control level that controls a travel trajectory of the vehicle,
   control the travel trajectory of the vehicle by controlling the steering angle of said steerable wheels on the basis of the first target control level,
   determine a target turning behavior control level which causes a turning behavior of the vehicle to obtain a target turning behavior,
   control the turning behavior of the vehicle on the basis of said target turning behavior control level,
   calculate a target steering angle of the steerable wheels on the basis of a second target control level which is based on the amount of steering operation provided to the steering input unit by the driver and the first target control level, and
   calculate the target turning behavior control level on the basis of the target steering angle of the steerable wheels.

2. A control device for a vehicle, comprising:
   means for altering a relationship between an amount of steering operation of a driver of the vehicle and a steering angle of steerable wheels of the vehicle without actuating a steering input unit which is operated by the driver;
   means for calculating a first target control level that controls the travel trajectory of the vehicle and for controlling the travel trajectory of the vehicle by controlling the steering angle of said steerable wheels on the basis of the first target control level;
   means for determining a target turning behavior control level which causes a turning behavior of the vehicle to obtain a target turning behavior and controlling the turning behavior of the vehicle on the basis of said target turning behavior control level, and
   arbitration means for calculating a target steering angle of the steerable wheels on the basis of a second target control level which is based on the amount of steering operation provided to the steering input unit by the driver and the first target control level, wherein the means for determining calculates the target turning behavior control level on the basis of the target steering angle of the steerable wheels.

3. A control system for a vehicle, comprising:
   a steering angle control processing unit that alters a relationship between an amount of steering operation of a driver of the vehicle and a steering angle of steerable wheels of the vehicle without actuating a steering input unit which is operated by the driver;
   a trajectory control processing unit that calculates a first target control level that controls the travel trajectory of the vehicle and controls the travel trajectory of the vehicle controlling the steering angle of said steerable wheels on the basis of the first target control level; and
   a turning behavior control processing unit that determines a target turning behavior control level which causes a turning behavior of the vehicle to obtain a target turning behavior and controls the turning behavior of the vehicle on the basis of said target turning behavior control level, and
   an arbitration control processing unit that calculates a target steering angle of the steerable wheels on the basis of a second target control level which is based on the amount of steering operation provided to the steering input unit by the driver and the first target control level, wherein the turning behavior control processing unit calculates the target turning behavior control level on the basis of the target steering angle of the steerable wheels.

4. A control system for a vehicle according to claim 3, wherein said steering angle control processing unit has a steering characteristic control function that alters the relationship between the amount of steering operation of the driver and the steering angle of said steerable wheels so as to achieve a predetermined steering characteristic, and said turning behavior control processing unit calculates said second target control level based on the amount of steering operation as a value including a variation in the steering angle of said steerable wheels caused by said steering characteristic control function.

5. A control system for a vehicle according to claim 3, wherein said turning behavior control processing unit controls the turning behavior of the vehicle by controlling at least the steering angle of said steerable wheels via said steering angle control processing unit; said turning behavior control processing unit calculates the target turning behavior control level on the basis of the second target control level based on the amount of steering operation and the first target control level of said trajectory control device processing unit, and said arbitration control processing unit calculates said target steering angle on the basis of the second target control level based on the amount of steering operation, the first target control level of said trajectory control processing unit, and the target turning behavior control level.

6. A control system for a vehicle according to claim 3, wherein said turning behavior control processing unit calculates a target turning state quantity on the basis of the target steering angle of said steerable wheels, and calculates a target turning behavior control level on the basis of said target turning state quantity, which is one of a target yaw rate of the vehicle, a target steering angle of said steerable wheels, a target control level of said steering angle control processing unit, and a target amount of steering operation of the driver.

7. A control system for a vehicle, comprising:
   a steering angle control processing unit that alters a relationship between an amount of steering operation of a driver of the vehicle and a steering angle of steerable wheels of the vehicle by steering the steerable wheels without actuating a steering input unit which is operated by the driver;
   an arbitration control processing unit that controls said relationship via said steering angle control device and includes at least a trajectory control processing unit that controls the travel trajectory of the vehicle by controlling the steering angle of said steerable wheels via the steering angle control processing unit; and a turning behavior control processing unit that determines a target turning behavior control level for causing the turning behavior of the vehicle to be a target turning behavior, and controls the turning behavior of the vehicle by controlling the steering angle of the steerable wheels via the steering angle control processing unit on the basis of the target turning behavior control level;

wherein a target control level on the steering angle of said steerable wheels is calculated at least on the basis of a first target control level of said trajectory control processing unit and the target turning behavior control level and the steering angle control processing unit controls the steering angle of said steerable wheels on the basis of the target control level on the steering angle of said steerable wheels, said turning behavior control processing unit calculates the target turning behavior control level on the basis of a value which is derived as a function of a correction amount of the steering angle of the steering wheels which corresponds to the target turning behavior control level from an actual steering angle of the steerable wheels.

8. A control system for a vehicle according to claim 7, wherein said arbitration control processing unit includes a steering characteristic control processing unit that alters said relationship so as to achieve a predetermined steering characteristic, and said target control level on the steering angle of said steerable wheels is calculated on the basis of a second target control level of said steering characteristic control processing unit, the first target control level of said trajectory control processing unit, and the target turning behavior control level.

9. A control system for a vehicle according to claim 7, wherein said turning behavior control processing unit calculates a target turning state quantity on the basis of the value which is derived as a function of a correction amount of a steering angle of said steerable wheels which corresponds to the target turning behavior control level from an actual steering angle of said steerable wheels, and calculates the target turning behavior control level on the basis of said target turning state quantity, which is one of a target yaw rate of the vehicle, a target steering angle of said steerable wheels, a target control level of said steering angle control processing unit and a target amount of steering operation of the driver.

10. A control system for a vehicle according to claim 9, wherein said target turning state quantity is a target yaw rate of the vehicle, and the turning behavior control processing unit controls the turning behavior of the vehicle by controlling a braking-driving-force of each vehicle wheel on the basis of the target yaw rate.

* * * * *